United States Patent
Brown et al.

(10) Patent No.: US 9,575,843 B2
(45) Date of Patent: Feb. 21, 2017

(54) MANAGING BACK UP SETS BASED ON USER FEEDBACK

(75) Inventors: Andrew Peter Brown, Glasgow (GB); Jeffrey C. Flowers, Marblehead, MA (US); Jessica Ann Mcisaac, Boston, MA (US); David Friend, Boston, MA (US)

(73) Assignee: Carbonite, Inc., Newton, MA (US)

( * ) Notice: Subject to any disclaimer, the term of this patent is extended or adjusted under 35 U.S.C. 154(b) by 917 days.

(21) Appl. No.: 13/638,557

(22) PCT Filed: Mar. 29, 2010

(86) PCT No.: PCT/US2010/029002
§ 371 (c)(1),
(2), (4) Date: Sep. 28, 2012

(87) PCT Pub. No.: WO2011/123089
PCT Pub. Date: Oct. 6, 2011

(65) Prior Publication Data
US 2013/0018946 A1    Jan. 17, 2013

(51) Int. Cl.
*G06F 15/173* (2006.01)
*G06F 11/14* (2006.01)

(52) U.S. Cl.
CPC ....... *G06F 11/1451* (2013.01); *G06F 11/1448* (2013.01); *G06F 11/1464* (2013.01); *G06F 11/1469* (2013.01)

(58) Field of Classification Search
USPC ................................................ 709/223, 203
See application file for complete search history.

(56) References Cited

U.S. PATENT DOCUMENTS

| | | | |
|---|---|---|---|
| 7,680,957 B1* | 3/2010 | Ketterhagen et al. | 709/223 |
| 8,924,352 B1* | 12/2014 | Andruss et al. | 707/640 |
| 2004/0193953 A1* | 9/2004 | Callahan et al. | 714/15 |
| 2004/0250162 A1* | 12/2004 | Halley | G06F 11/1458 714/13 |

(Continued)

FOREIGN PATENT DOCUMENTS

| | | |
|---|---|---|
| KR | 10-2002-0065976 | 8/2002 |
| KR | 10-2005-0041898 | 5/2005 |
| WO | WO-2007/059174 | 5/2007 |

OTHER PUBLICATIONS

International Search Report on PCT/US2010/029002 dated Dec. 23, 2010.

(Continued)

*Primary Examiner* — Philip B Tran
(74) *Attorney, Agent, or Firm* — Foley & Lardner LLP; Daniel Rose

(57) ABSTRACT

The management of backup sets based on user feedback techniques include a method, and a system. In some embodiments of these techniques, the method includes receiving an update to a backup set from a first client device. The method further includes analyzing the update made to the backup set. The method further includes updating a default backup set stored in a storage device based on the update to the backup set. This Abstract is provided for the sole purpose of complying with the Abstract requirement rules. This Abstract is submitted with the explicit understanding that it will not be used to interpret or to limit the scope or the meaning of the claims.

19 Claims, 21 Drawing Sheets

(56) References Cited

U.S. PATENT DOCUMENTS

| | | | |
|---|---|---|---|
| 2005/0010616 A1* | 1/2005 | Burks | 707/204 |
| 2005/0021950 A1* | 1/2005 | Rothbarth et al. | 713/165 |
| 2005/0131990 A1* | 6/2005 | Jewell | 709/201 |
| 2006/0271601 A1* | 11/2006 | Fatula | G06F 11/1464 707/999.201 |
| 2007/0276885 A1 | 11/2007 | Valiyaparambil et al. | |
| 2008/0235299 A1* | 9/2008 | Haselton et al. | 707/204 |
| 2010/0070475 A1* | 3/2010 | Chen | 707/640 |
| 2011/0078116 A1* | 3/2011 | Zhang | H04L 65/4084 709/203 |

OTHER PUBLICATIONS

Written Opinion on PCT/US2010/029002 dated Dec. 23, 2010.
Canadian Examiner's Report on 2,794,341 dated Jun. 28, 2016.

* cited by examiner

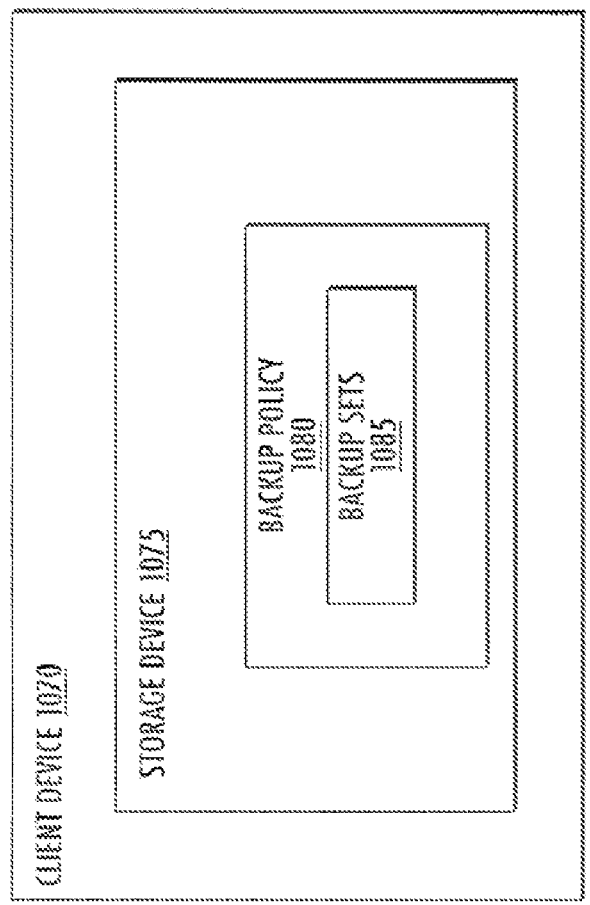

FIG. 11

```
BACKUP SETS BEFORE USER UPDATES.xml - NOTEPAD
File Edit Format View Help
<UserData id="8423" lastName="Doe" firstName="John">
  <BackupPolicy id="1234" name="JohnDoeLaptop">
    <BackupSet id="12345" name="Desktop">
      <FolderList><Folder path="C:\users\jdoe\Desktop" /></FolderList>
      <ExcludeList>
        <Folder path="C:\users\jdoe\Desktop\old" />
      </ExcludeList>
      <FileTypes></FileTypes>
      <FileSize></FileSize>
      <FileModificationDate></FileModificationDate>
    </BackupSet>
    <BackupSet id="12346" name="Movies">
      <FolderList><Folder path="C:\users\jdoe\My Movies" /></FolderList>
      <ExcludeFolderList></ExcludeFolderList>
      <FileTypes><type extension="mov"></type>
                 <type extension="wmv"></type>
                 <type extension="m4v"></type></FileTypes>
      <FileSize></FileSize>
      <FileModificationDate></FileModificationDate>
    </BackupSet>
    <BackupSet id="12347" name="Music">
      <FolderList><Folder path="C:\users\jdoe\My Music"></Folder></FolderList>
      <ExcludeFolderList></ExcludeFolderList>
      <FileTypes><type extension="mv"></type>
                 <type extension="mp3"></type></FileTypes>
      <FileSize></FileSize>
      <FileModificationDate></FileModificationDate>
    </BackupSet>
  </BackupPolicy>
</UserData>
```

FIG. 12

| | NAME | FILES | SIZE |
|---|---|---|---|
| ☑ | DESKTOP | 2 | 3 KB |
| ☑ | FAVORITES (IE) | 41 | 6 KB |
| ☑ | MUSIC | 11 | 58 MB |
| ☑ | PHOTOS AND IMAGES | 18 | 5 MB |
| ☑ | PRESENTATIONS | 42 | 43 MB |
| ☑ | SPREADSHEETS AND DATABASES | 3 | 32 KB |
| ☑ | VIDEO AND MOVIE CLIPS | 3 | 9 MB |
| ☑ | VISUAL STUDIO PROJECTS | 11 | 3 MB |
| ☑ | WORD PROCESSING DOCUMENTS | 51 | 18 MB |
| ☐ | MY DOCUMENTS | 200 | 137 MB |
| ☐ | ALL USER FILES | 1922 | 3 GB |

BACKUP SETS +

FIG. 13

| BACKUP SETS | File System | | | Ignored Files/Folders | | | |
|---|---|---|---|---|---|---|---|
| NAME | Files | Size | | Name | In Folder | Size | Type |
| ☑ DESKTOP | 2 | 3 KB | | ☑ 2008 Annual Performance Review | C:\Users\TTitchener\Documents | 119 KB | doc |
| ☑ FAVORITES (IE) | 41 | 6 KB | | ☑ 2008 Annual Performance Review | C:\Users\TTitchener\Documents | 114 KB | doc |
| ☑ MUSIC | 11 | 56 MB | | ☑ 2009 Setting Objectives and Goa | C:\Users\TTitchener\Documents | 64 KB | doc |
| ☑ PHOTOS AND IMAGES | 19 | 5 MB | | ☐ Tom Titchener 2007.pdf | C:\Users\TTitchener\Documents\Downloads | 1 MB | pdf |
| ☑ PRESENTATIONS | 42 | 43 MB | | ☐ haskell 98 tutorial.pdf | C:\Users\TTitchener\Documents\Downloads | 4 KB | pdf |
| ☑ SPREADSHEETS AND DATABASES | 3 | 32 KB | | ☑ Haskell 98 Tutorial.pdf | C:\Users\TTitchener\Documents\Haskell | 835 KB | pdf |
| ☑ VIDEO AND MOVIE CLIPS | 3 | 9 MB | | ☐ A Gentle Introduction to Haskell. | C:\Users\TTitchener\Documents\PDFs | 533 KB | pdf |
| ☑ VISUAL STUDIO PROJECTS | 11 | 3 MB | | ☐ Beautiful concurrency.pdf | C:\Users\TTitchener\Documents\PDFs | 433 KB | pdf |
| ☑ WORD PROCESSING DOCUMENTS | 1 | 18 MB | | ☐ C++0x Standard.pdf | C:\Users\TTitchener\Documents\PDFs | 1 MB | pdf |
| ☑ MY DOCUMENTS | 200 | 137 MB | | ☐ C++Ox6nopcle.pdf | C:\Users\TTitchener\Documents\PDFs | 1 MB | pdf |
| ☐ ALL USER FILES | 1922 | 3 GB | | ☐ CAE3040.pdf | C:\Users\TTitchener\Documents\PDFs | 563 KB | pdf |
| | | | | ☐ Concurrent Programming Withou | C:\Users\TTitchener\Documents\PDFs | 597 KB | pdf |
| | | | | ☐ Convergence in Language Design | C:\Users\TTitchener\Documents\PDFs | 246 KB | pdf |
| | | | | ☐ From Chits to Quite.pdf | C:\Users\TTitchener\Documents\PDFs | 155 KB | pdf |
| | | | | ☐ Genetic Topology.pdf | C:\Users\TTitchener\Documents\PDFs | 172 KB | pdf |
| | | | | ☐ Gentle Introduction to Haskell 98 | C:\Users\TTitchener\Documents\PDFs | 835 KB | pdf |
| | | | | ☐ haskell tutorial.pdf | C:\Users\TTitchener\Documents\PDFs | 602 KB | pdf |
| | | | | ☐ HaskellRetrospective.pdf | C:\Users\TTitchener\Documents\PDFs | 160 KB | pdf |
| | | | | ☐ history of haskell.pdf | C:\Users\TTitchener\Documents\PDFs | 889 KB | pdf |

FIG. 14

MANAGING BACK UP SETS BASED ON USER FEEDBACK

RELATED APPLICATIONS

The present application claims priority to and is a national phase entry under 35 U.S.C. §371 of co-pending International Application No. PCT/US2010/029002, entitled "Managing Backup Sets Based on User Feedback," filed Mar. 29, 2010 and designating the United States, the entirety of which is hereby incorporated by reference.

FIELD OF THE INVENTION

The present invention relates generally to computer-based methods and apparatuses, including computer program products, for managing backup sets based on user feedback.

BACKGROUND

Computer systems are ubiquitous in today's work and home environments. The data stored on these computer systems, however, is vulnerable to theft, lire, flood, and other natural disasters. A user may only realize that data of interest to the user was not backed up after the data is lost (e.g., due to disk failure). Thus, a need exists for a system that allows users to easily manage data backup. Also, a need exists for a system that analyzes modifications made by users to their backup selections to update backup set selections of other users as well as default backup selections.

SUMMARY

One approach to managing backup sets based on user feedback is a method. The method includes receiving an update to a backup set from a first client device. The method further includes analyzing the update made to the backup set. The method further includes updating a default backup set stored in a storage device based on the update to the backup set.

Another approach to managing backup sets based on user feedback is a method. The method includes modifying a backup set. The method further includes transmitting the modified backup set to a backup set management server. The method further includes receiving, from the backup set management server, a recommended modification to a second backup set, the modification to the second backup set associated with modifications made by one or more users to backup sets associated with the one or more users. The method further includes modifying the second backup set based on the recommended modification received from the server.

Another approach to managing backup sets based on user feedback is a system. The system includes a communication module configured to receive one or more modifications to one or more backup sets from one or more users. The system further includes a backup set management module. The backup set management module is configured to analyze the received one or more modifications for the one or more backup sets, and aggregate the received one or more modifications into one or more backup set updates. The system further includes a user preference module. The user preference module is configured to modify a first plurality of backup sets stored in a database based on the one or more backup sets updates.

Another approach to managing backup sets based on user feedback is a system. The system includes a client backup set management module. The client backup set management module is configured to modify at least one backup set in a first plurality of backup sets. The system further includes a communication module. The communication module is configured to send the modified first plurality of backup sets to a server, and receive, from the server, one or more modifications to the first plurality of backup sets based on changes made by one or more users to a second plurality of backup sets. The client backup set management module is further configured to modify the first plurality of backup sets based on the modifications received from the server.

Another approach to managing backup sets based on user feedback is a system. The system includes a means for receiving an update to a backup set from a first client device. The system further includes a means for analyzing the update made to the backup set. The system further includes a means for updating a default backup set stored in a storage device based on the update to the backup set.

Another approach to managing backup sets based on user feedback is a system. The system includes a means for modifying a backup set. The system further includes a means for transmitting the modified backup set to a backup set management server. The system further includes a means for receiving, from the backup set management server, a recommended modification to a second backup set, the modification to the second backup set associated with modifications made by one or more users to backup sets associated with the one or more users. The system further includes a means for modifying the second backup set based on the recommended modification received from the server.

Other aspects and advantages of the present invention will become apparent from the following detailed description, taken in conjunction with the accompanying drawings, illustrating the principles of the invention by way of example only.

BRIEF DESCRIPTION OF THE DRAWINGS

Various embodiments taught herein are illustrated by way of example, and not by way of limitation, in the figures of the accompanying drawings, in which:

FIG. 10B is a block diagram illustrating an exemplary client device;

FIG. 11 illustrates an exemplary backup policy;

FIG. 12 illustrates another exemplary backup policy;

FIGS. 13, 14, and 15 illustrate exemplary interfaces displaying backup sets;

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims.

DETAILED DESCRIPTION

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Figure 1:
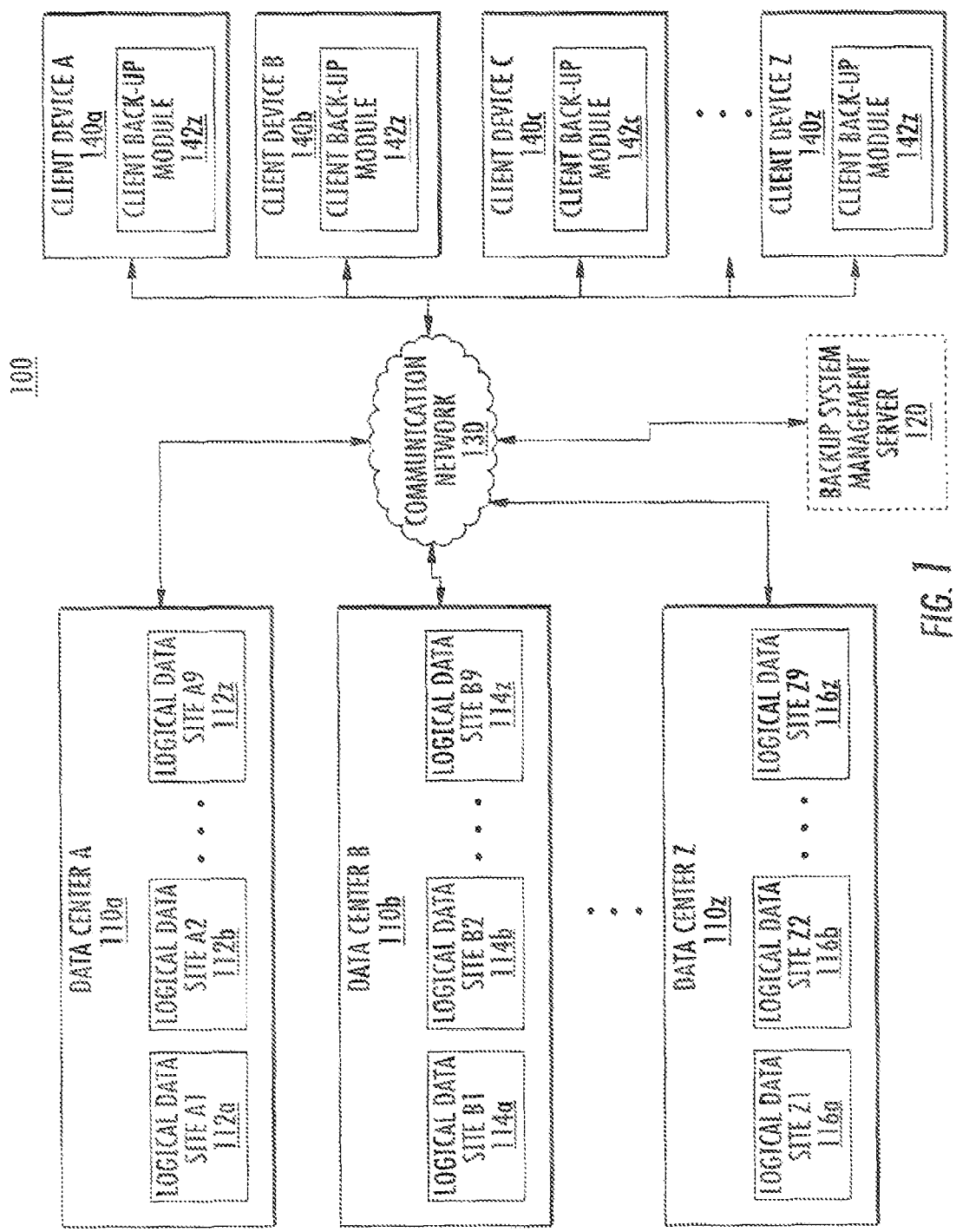
FIG. 1 is a block diagram illustrating an exemplary system, according to one exemplary embodiment.

FIG. 1 illustrates an exemplary system 100 for backup and restoration of user data (e.g., one or more document files, one or more audio files, etc.) between client devices A 140a, B 140b, C 140c through Z 140z (e.g., personal computer, server computing system, personal digital assistant, phone, music player, etc.) and data centers A 110a, B 110b through Z 110z (e.g., server systems with a plurality of data storage devices, server systems connected to a plurality of network data storage devices, etc.). The system 100 includes a communication network 130 (e.g., internet protocol (IP) network, a local area network (LAN), internet, etc.) and a backup system management server 120.

Each data center A 110a, B 110b through Z 110z includes a plurality of logical data sites 1, 2 through 9, 112a, 112b through 112z, 114a, 114b through 114z, and 116a, 116b, through 116z, respectively. Each client device A 140a, B 140b, C 140c through Z 140z includes a client backup module 142a, 142b, 142c, through 142z, respectively. The data centers 110a-110z, the client devices 140a-140z, and/or the backup system management server 120 communicate via the communication network 130.

The backup system management server 120 can manage the backup of user data from the client devices 140a-140z to one or more of the logical data sites at one or more of the data centers 110a-110z. The backup system management server 120 can manage the restoration of user data from one or more of the logical data sites at one or more of the data centers 110a-110z to the client devices 140a-140z. The backup system management server 120 can communicate with the client backup module 142a-142z on each client device 140a-140z to manage the backup and/or restoration of the user data (e.g., pause backup, start backup, select backup set, start restoration, schedule backup, communicate a backup policy, update a backup set, etc.).

In some examples, the restoration of the user data is to the originating client device (e.g., the client device from which the user data originated from, the client device connected to the computing device which the user data originated from, etc.). In other examples, the restoration of the user data is to another client device that is not the originating client device (e.g., new user computer, etc.).

In other examples, each data center 110a-110z includes a data center management server (not shown) for managing the backup and/or the restoration of the user data. In some examples, each logical site includes a site management server for managing the backup and/or the restoration of the user data. In other examples, the backup system management server 120 manages the backup and/or the restoration of the user data by managing one or more of the data center management servers and/or one or more of the site management servers.

Although FIG. 1 illustrates a single communication network 130, the system can include a plurality of communication networks and/or the plurality of communication networks can be configured in a plurality of ways (e.g., a plurality of interconnected local area networks (LAN), a plurality of interconnected wide area network (WAN), a plurality of interconnected LANs and/or WANs, etc.).

Although FIG. 1 illustrates the data centers A 110a, B 110b through Z 110z, the logical data sites 1, 2 through 9 (e.g. 112a-112z), and the client device A 140a, B 140b, C 140c through Z 140z, the system 100 can include any number of data centers, logical data sites, and/or client devices. In some examples, data centers A, 13, and C include ten logical data sites and data centers D, E, F, and G include twenty logical data sites. In other examples, ten thousand client devices are associated with each logical data site. In this example, data center G is associated with two hundred thousand client devices since data center G includes twenty logical data sites and each logical data site is associated with ten thousand client devices.

Figure 2:
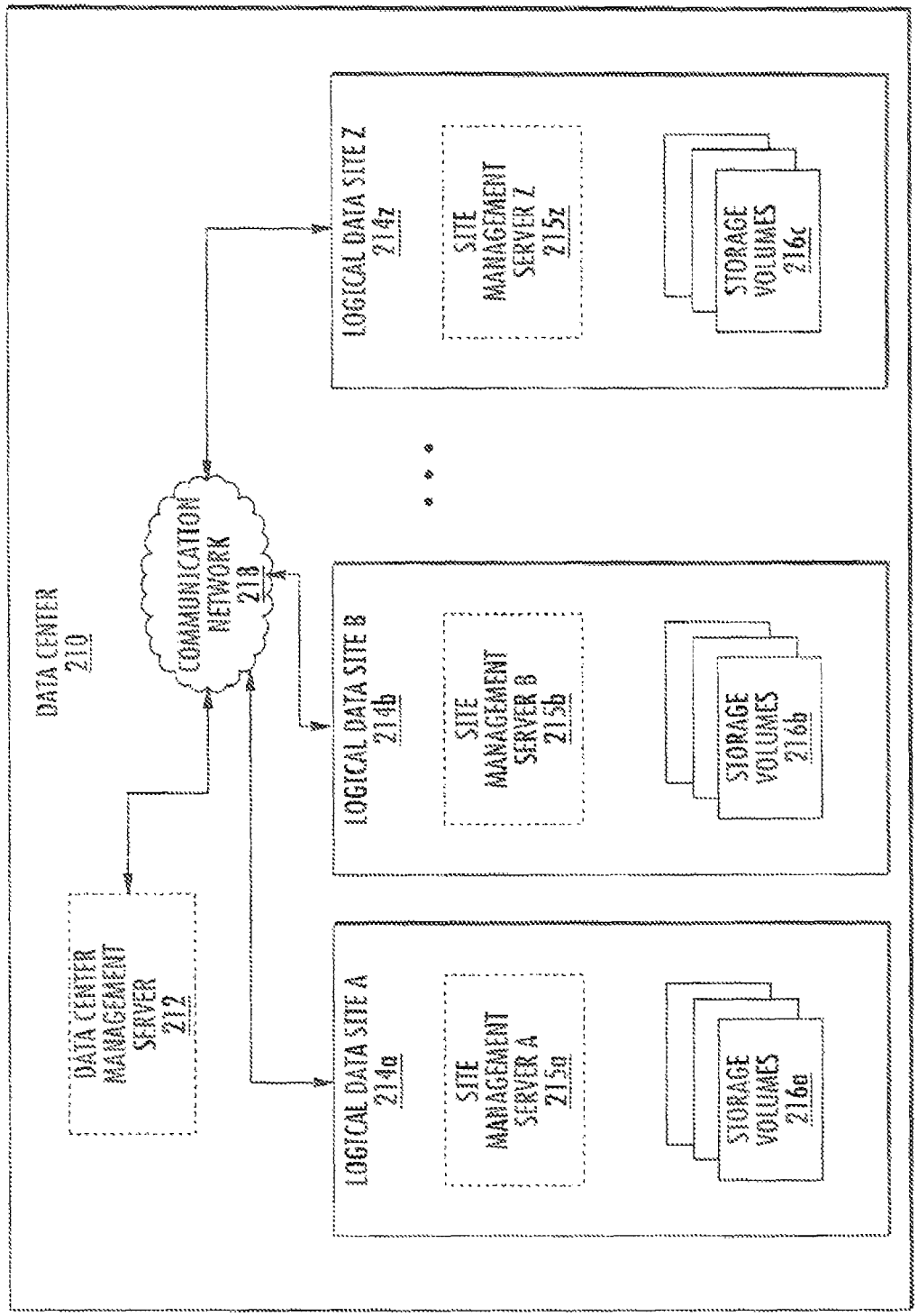
FIG. 2 is a block diagram illustrating an exemplary data center, according to one exemplary embodiment.

FIG. 2 illustrates an exemplary data center 210. The data center 210 includes a data center management server 212, logical data sites A 214a, B 214b through Z 214z, and a communication network 218. Each logical data site A 214a, B 214b through Z 214z includes a site management server A 215a, B 215b through Z 215z and one or more storage volumes 216a, 216b through 216z (e.g., logical storage volumes, storage devices, distributed storage devices, etc.). The data center management server 212 and/or the site manager servers 215a, 215b through 215z can manage the plurality of logical data sites 214a-214z.

Each logical data site A 214a, B 214b through Z 214z can store and/or retrieve the backup of user data associated with a plurality of users (e.g., subscribers to a backup subscription service, users in a corporate network, etc.). The storage volumes 216a-216z at each logical site 214a-214z can store and/or retrieve the backup of the user data.

In some examples, the backup of the user data is stored on a single storage volume (e.g., single storage device, single logical storage volume, redundant array of inexpensive disks (RAID) storage device, etc.). In other examples, the backup of the user data is stored on one or more storage volumes (e.g., distributed backup among a plurality of storage devices, redundant backup among a plurality of logical storage volumes, redundant backup among a plurality of RAID storage devices, etc.).

In some examples, the data center management server 212 manages the backup and/or the restoration for the data center 210 and the site manager server manages the storage and/or retrieval at the respective logical data site.

Although FIG. 2 illustrates a data center 210 with the logical data sites A 214a, B 214b through Z 214z, the data center 210 can include a single logical data site or any number of logical data sites (e.g., twenty, forty, one hundred, etc.). Although FIG. 2 illustrates the data center management server 212 and/or the site management server, the storage and/or retrieval of the backups of user data can be managed individually by either the data center management server 212 or the site management server at each respective logical site.

Figure 3:
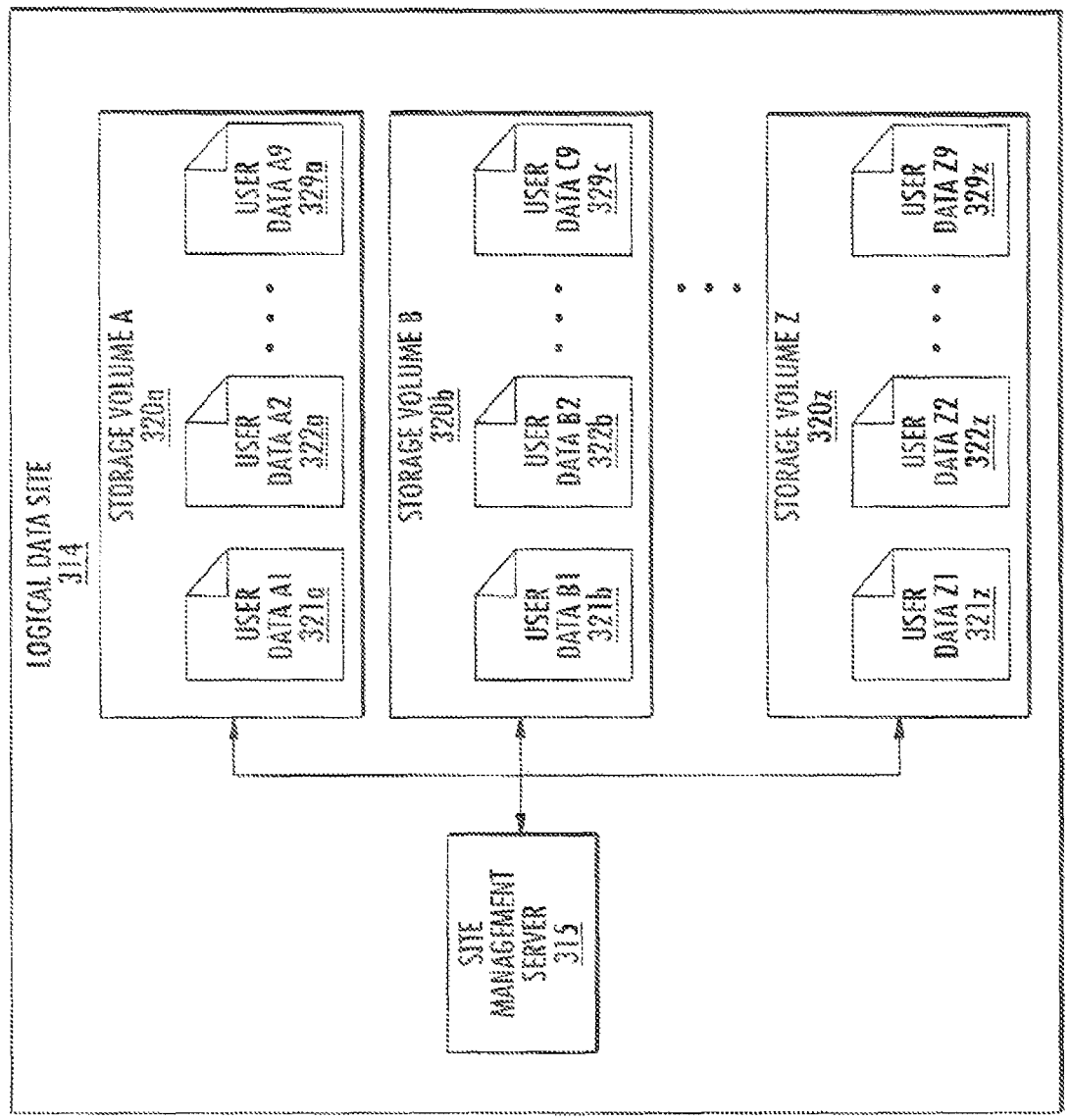
FIG. 3 is block diagram illustrating an exemplary logical data site, according to one exemplary embodiment.

FIG. 3A illustrates a logical data site 304. The logical data site 304 includes a site management server 305 and storage server A 310a, B 314b through Z 320z. The storage server A 310a includes a storage volume A 312a. The storage server B 314b includes a storage volume B1 316b and a storage volume B2 318b. The storage server Z 320z includes storage volumes Z1 322z through Z3 328z. Any number of storage volumes can be grouped within a storage server. Each storage volume includes a plurality of user data backup (not shown). The site management server 305 can communicate with the storage servers A 310a, B 314b through Z 320z to backup and/or restore the backup of the user data.

Although FIG. 3A illustrates storage servers A 310a, B 314b through Z 320z and storage volumes 312a, 316b, 318b, 322z through 328z, the logical data site 304 can include any number of storage servers and/or storage volumes. For example, the logical data site 304 can include four storage servers and each storage server includes forty storage volumes.

In some embodiments, the site management server 305 can include a database server and a server managing storage bandwidth resources for the logical data site 304. In these embodiments, the site management server 305 can control one or more communications servers that act as intermediary between client communication module 805 and the storage servers A 310a, B 314b through Z 320z.

FIG. 3B illustrates logical data site 334. The logical data site 334 includes a site management server 335 and a storage server 320. The storage server 320 includes storage volumes A 330a, B 330b through Z 330z. Each storage volume A 330a, B 330b through Z 330z includes plurality of user data 1, 2 through 9 (e.g., the user data is the backup of the user data stored on a client device associated with the user). The site management server 335 can communicate with the storage server 320 and/or the storage volumes A 330a, B 330b through Z 330z to backup and/or restore the backup of the user data.

In some examples, the site management server 335 can communicate with the storage volumes to transfer user data between the storage volumes. In some examples, the site management server 335 can communicate with one or more site management servers (not shown) at one or more other logical data sites (not shown to transfer user data between the logical data sites.

Although FIG. 3B illustrates storage volumes A 330a, B 330b through Z 330z and user data 1, 2 through 9, the logical data site 334 can include any number of storage volumes and/or user data. For example, the logical data site 334 can include twenty storage volumes and each storage volume includes user data associated with one thousand users.

Figure 4:
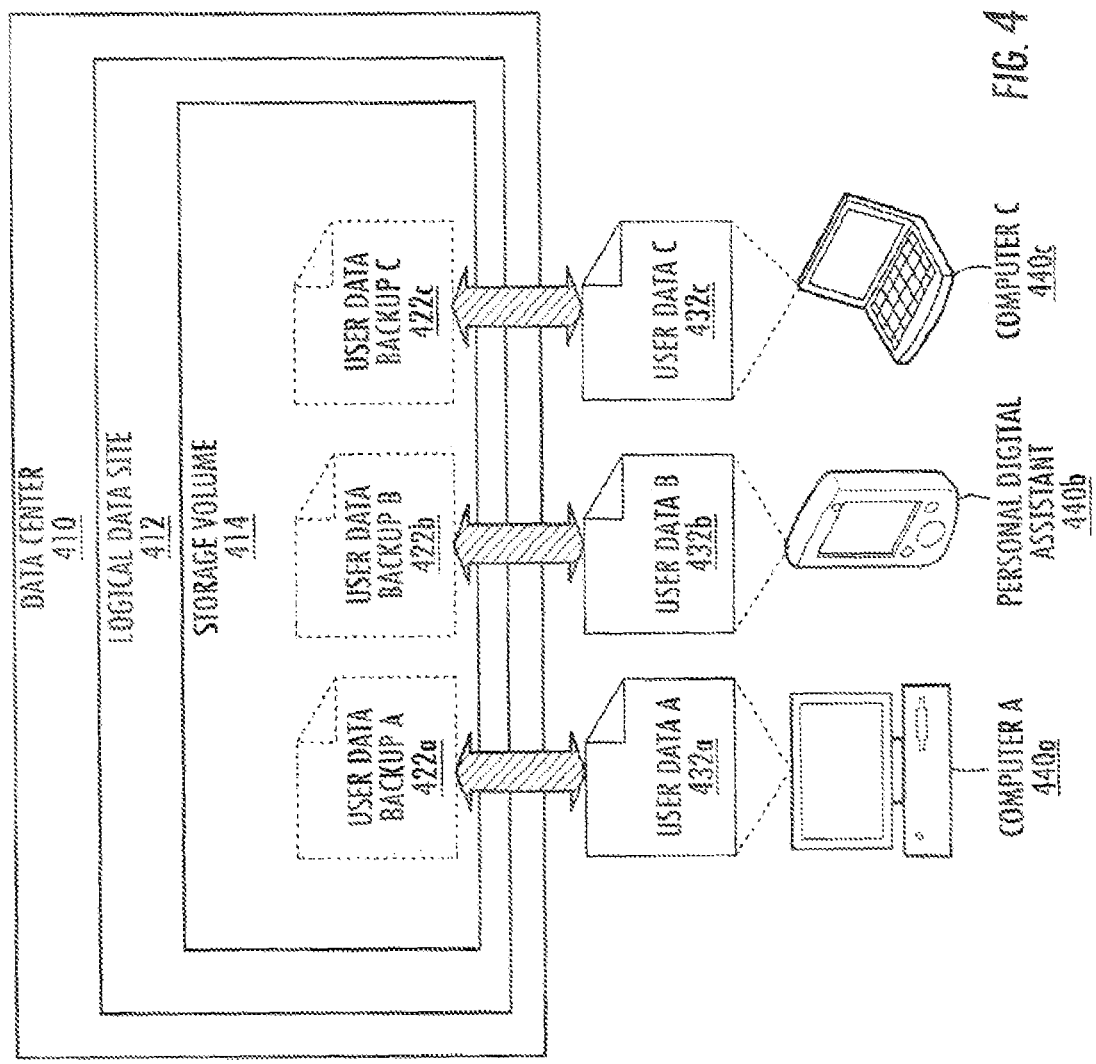
FIG. 4 is a block diagram illustrating an exemplary data center storing user data backup from client devices, according to one exemplary embodiment.

FIG. 4 illustrates an exemplary data center 410 for the backup of user data from one or more client devices 440a, 440b, and 440c. The data center 410 includes a logical data site 412. The logical data site 412 includes a storage volume 414. The storage volume 434 includes user data backups A 432a, B 432b, and C 432c. The user data backups A 422a, B 422b, and C 422c correspond to user data A 432a, B 432b, and C 432c, respectively. The user data A 432a, B 432b, and C 432c are stored on the client devices, computer A 440a, personal digital assistant 440b, and computer B 440c, respectively. As illustrated in FIG. 4, the user data A 432a, B 432b, and C 432c stored on the client devices is backed up to the storage volume 414 on the logical data site 412 in the data center 410.

Figure 5:
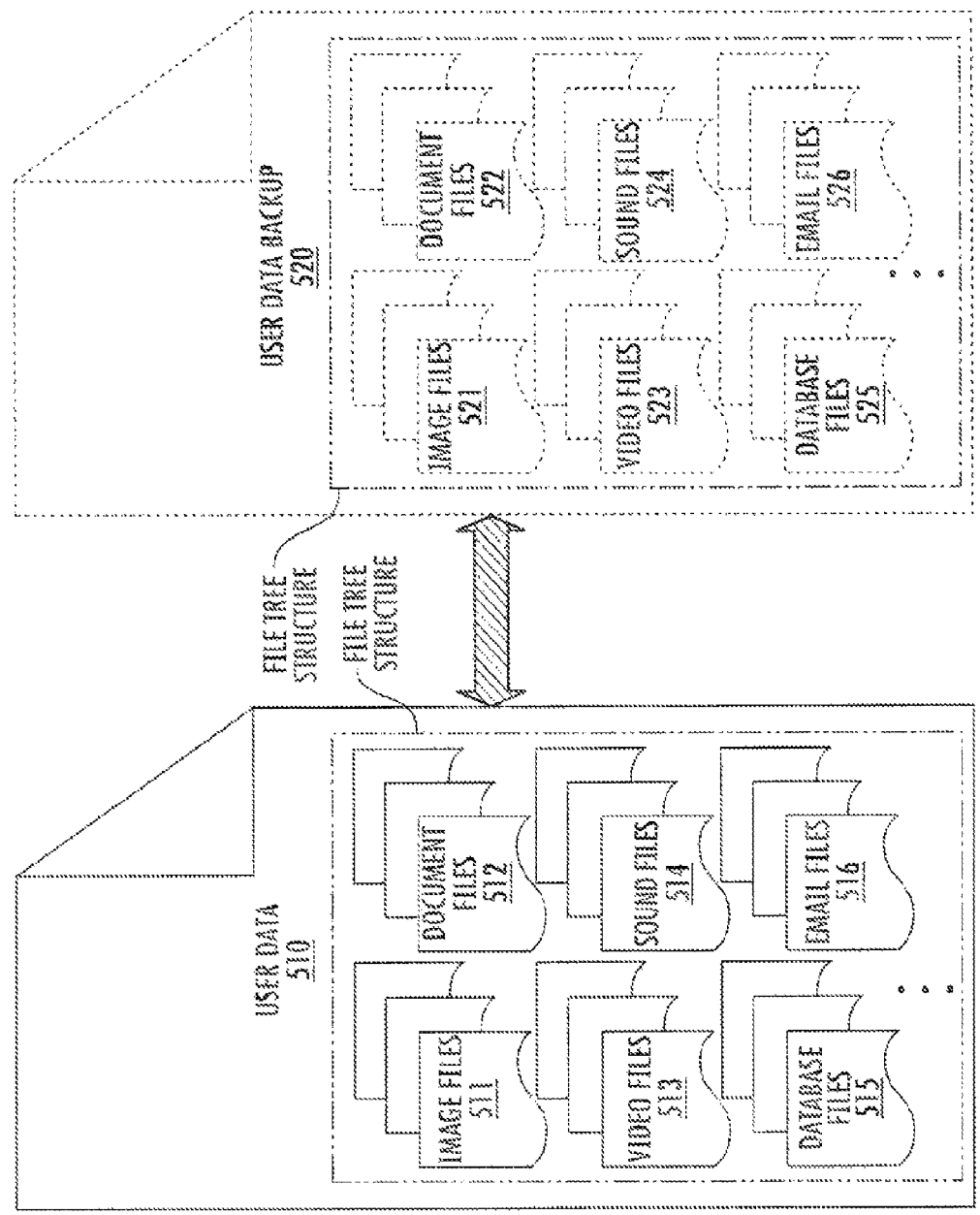
FIG. 5 illustrates exemplary user data and user data backup, according to one exemplary embodiment.

FIG. 5 illustrates exemplary user data 510 and user data backup 520. The user data 510 includes a plurality of files, image files 511, document files 512, video files 513, sound files 514, database files 515, and email files 516, and/or other information (e.g., registry information, user preference information, etc.) stored on a client device in a file tree structure (e.g., hierarchal database, hierarchal flat file, etc.). The user data backup 520 includes a plurality of files, image files 521, document files 522, video files 523, sound files 524, database files 525, and email files 526, and/or other information that is selected for backup by the user, automatically by the management server (e.g., site management server, data center management server, etc.), and/or based on backup templates and/or backup policies. The technology as described herein can be utilized to backup the user data as the user data backup.

Although FIG. 5 illustrates certain types of files (e.g., image files, document files, etc.), the technology as described herein can backup any type of information and/or data stored on the client device and/or a storage device connected to the client device (e.g., external storage device, network connected storage device, etc).

Figure 6:
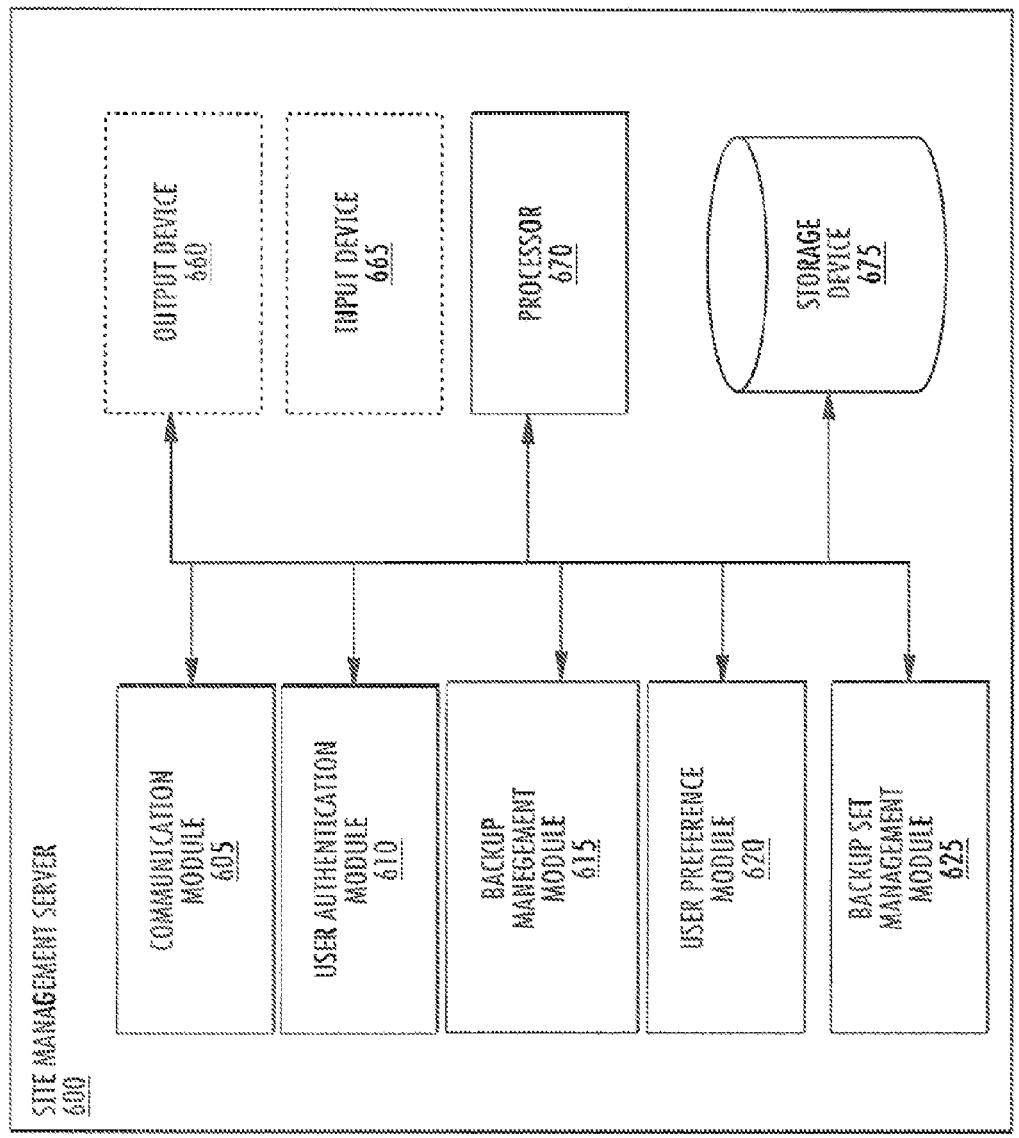
FIG. 6 is a block diagram illustrating an exemplary logical data site management server, according to one exemplary embodiment.

FIG. 6 illustrates an exemplary site management server 600. The site management server 600 includes a communication module 605, a user authentication module 610, a backup management module 615, a user preference module 620, a backup set management module 625, an output device 660, an input device 665, a processor 670, and a storage device 675. The modules and/or devices can be hardware and/or software. The modules and/or devices illustrated in the site management server 600 can, for example, utilize the processor 670 to execute computer executable instructions and/or include a processor to execute computer executable instructions (e.g., an encryption processing unit, a field programmable gate array processing unit, etc.). It should be understood that the site management server 600 can include, for example, other modules, devices, and/or processors known in the art and/or varieties of the illustrated modules, devices, and/or processors. It should be understood that the modules and/or devices illustrated in the site management server 600 can be located within the site management server 600 and/or connected to the site management server 600 (e.g., directly, indirectly, etc.), but outside of the physical components of the management server (e.g., personal computer, mobile device, etc.).

The communication module 605 communicates data to/from the site management server 600. The user authentication module 610 authenticates users to the site management server 600. The backup management module 615 manages and/or controls backups to/from the site management server 600.

The user preference module 620 manages preferences of users and/or collects information associated with user selections and/or preferences. In some embodiments, the user preference module 620 can modify user's backup sets based on the analysis performed by the backup set management module. In other embodiments, the user preference module 620 can specify backup sets which are disallowed for a given policy. For example, music backup sets can be disallowed during the trial period.

The backup set management module 625 analyzes modifications made to backup sets by existing users. In some embodiments, the backup set management module 625 can aggregate backup set modifications made by users. The backup set management module 625 can determine based on this analysis whether to similarly modify default backup sets stored on the management server. A default backup set can include a set of related files aggregated together according to certain pre-determine criteria. The user preference module 620 modifies default backup sets and/or other users backup sets based on the analysis performed by the backup set management module 625.

In one embodiment, the backup set management module 625 can analyze changes made to the backup sets based on rules stored in the storage device 675. For example, a rule can provide that if a significant number of users (e.g., more than 75%, more than 90% of users associated with a user type, etc.) have added a new file type to their backup sets, the backup set management module 625 can determine that the new file type must be added to the default backup sets stored on the management server. As another example of a rule, if a significant number of users have added a new backup set (e.g., "Architectural Drawings", "Baby Pictures", etc.) that is not already one of the default backup sets, the backup set management module 625 can determine that the new backup set is to be added to the list of default backup sets. As an additional example of a rule, if users are changing one of the default backup sets in a similar way, the backup set management module 625 can determine that default backup sets can be modified correspondingly by changing/deleting one of the existing default backup sets or adding a new default backup set. In another embodiment, the backup set management module 625 can determine based on the analysis described above that backup sets of other users need to be updated automatically. In other embodiments, the backup set management module 625 can notify users with recommended modifications to their backup sets (e.g., adding files, updating file information, deleting files, etc.).

The output device 660 outputs information and/or data associated with the site management server 600 (e.g., information to a printer (not shown), information to a speaker, etc.). The input device 665 receives information associated with the site management server 600 (e.g., instructions from a user, instructions from a computing device, etc.) from a user (not shown) and/or a computing system (not shown). The input device 665 can include, for example, a keyboard, a scanner, an enrollment device, a scale, etc.

The processor 670 executes the operating system and/or any other computer executable instructions for the management server (e.g., executes applications, etc.). The site management server 600 can include random access memory (not shown). The random access memory can temporarily store the operating system, the instructions, and/or any other data associated with the management server. The random access memory can include one or more levels of memory storage (e.g., processor register, storage disk cache, main memory, etc.).

The storage device 675 stores the files, user preferences, backup sets, access information, an operating system and/or any other data or program code associated with the site management server 600. The storage device can include a plurality of storage devices. The storage device 675 can include, for example, long-term storage (e.g., a hard drive, a tape storage device, flash memory, etc.), short-term storage/e.g., a random access memory, a graphics memory, etc.), and/or any other type of computer readable storage.

Although FIG. 6 illustrates the exemplary site management server 600, any of the management servers described herein (e.g., data center management server) can include the components and functionality described with respect to the site management server 600.

Figure 7:
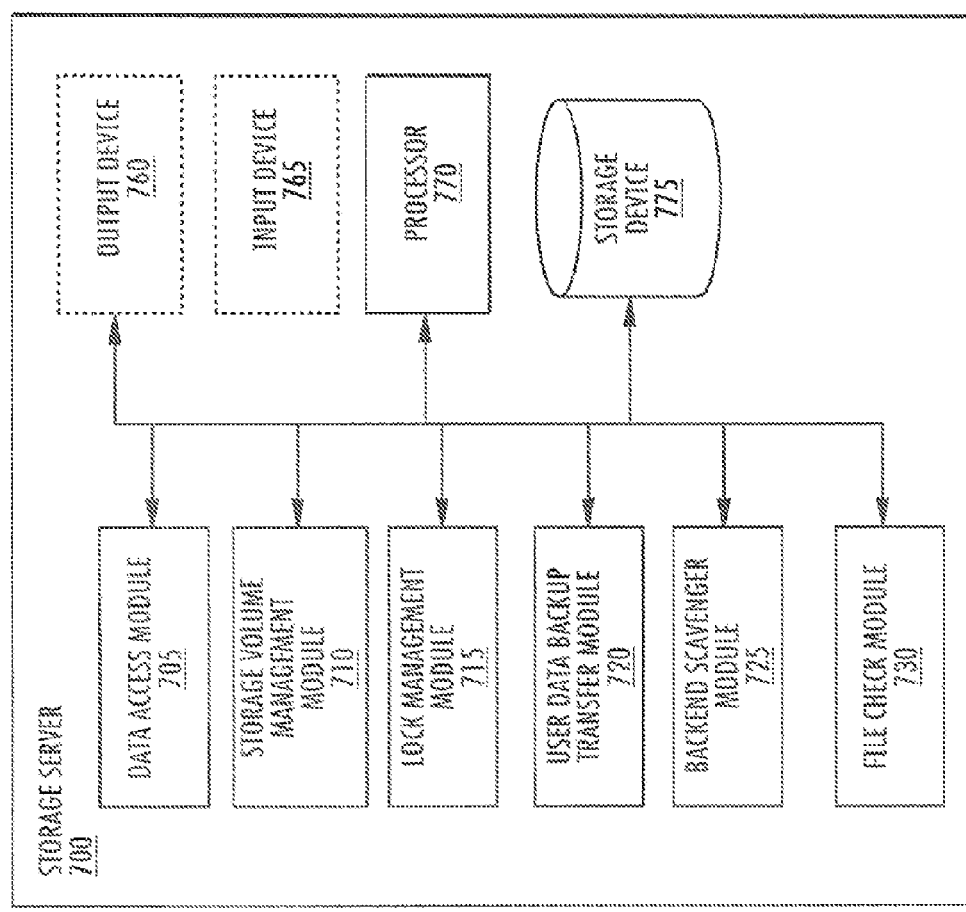
FIG. 7 is a block diagram illustrating an exemplary storage server, according to one exemplary embodiment.

FIG. 7 illustrates an exemplary storage server 700. The storage server 700 includes a data access module 705, a storage volume management module 710, a lock management module 715, a user data backup transfer module 720, a backend scavenger module 725, a file check module 730, an output device 760, an input device 765, a processor 770, and a storage device 775. The modules and/or devices can be hardware and/or software. The modules and/or devices illustrated in the storage server 700 can, for example, utilize the processor 770 to execute computer executable instructions and/or include a processor to execute computer executable instructions (e.g., an encryption processing unit, a field programmable gate array processing unit, etc.). It should be understood that the storage server 700 can include, for example, other modules, devices, and/or processors known in the art and/or varieties of the illustrated modules, devices, and/or processors. It should be understood that the modules and/or devices illustrated in the storage server 700 can be located within the storage server 700 and/or connected to the storage server 700 (e.g., directly, indirectly, etc.), but outside of the physical components of the management server (e.g., personal computer, mobile device, etc.).

The data access module 705 accesses data stored on the storage server 700. The storage volume management module 710 manages user data storages on a storage volume, a logical data site and/or data center.

The lock management module 715 manages locks for locking user data during transfer of user data, maintenance, etc. In some embodiments, the lock management module 715 can manage different types of locks, including a copy lock protecting file copying, an exclusive lock protecting user data from any access to user data, a scavenger lock protecting for read and occasional deletion of expired or corrupt files, a lock protecting user data for reading and writing, a read lock protecting user data for reading, and/or any other type of computer locking mechanism. In some embodiments, the locks can be local to a storage volume, storage server, or logical data site, etc.

The user data backup transfer module 720 manages transfer of user data backup between logical data sites and/or data centers. In some embodiments, the user data backup transfer module 720 transfers user data backup from a source logical data site to a destination logical data site which are located in two different data centers.

The backend scavenger module 725 deletes files no longer required by the client for backup. In some embodiments, the client device determines when to purge unwanted files, and updates the backup status files accordingly. Using the updated backup status files, the backend scavenger module 725 deletes files from storage volumes. The backend scavenger module 725 purges data for expired computers, deletes obsolete backup files, requests resend of missing files, performs server file integrity checks, aggregates client log files, gathers server file statistics to logs and database, and/or manages free space in the file system (e.g., NTFS, proprietary file system).

The file check module 730 deletes invalid files (e.g., expired files, suspended files, etc.). The file check module 730 verifies integrity of server files, gathers computer parameters from database, records activity to logs and database, and/or reads storage volume configurations from database, etc. In some embodiments, the file check module 730 moves invalid files to a predetermined folder on each storage volume, and the backend scavenger module 725 performs the actual deletion of the invalid files. In other embodiments, using a proprietary file system, the file check module 730 marks the invalid files for purging, and the file system internally manages the deletion of files marked for purging.

The output device 760 outputs information and/or data associated with the storage server 700 (e.g., information to a printer (not shown), information to a speaker, etc.). The input device 765 receives information associated with the storage server 700 (e.g., instructions from a user, instructions from a computing device, etc.) from a user (not shown) and/or a computing system (not shown). The input device 765 can include, for example, a keyboard, a scanner, an enrollment device, a scale, etc.

The processor 770 executes the operating system and/or any other computer executable instructions for the management server (e.g., executes applications, etc.). The storage server 700 can include random access memory (not shown). The random access memory can temporarily store the operating system, the instructions, and/or any other data associated with the management server. The random access memory can include one or more levels of memory storage (e.g., processor register, storage disk cache, main memory, etc.).

The storage device 775 stores the files, user preferences, backup sets, access information, an operating system and/or any other data or program code associated with the storage server 700. The storage device can include a plurality of storage devices. The storage device 775 can include, for example, long-term storage (e.g., a hard drive, a tape storage device, flash memory, etc.), short-term storage (e.g., a random access memory, a graphics memory, etc.), and/or any other type of computer readable storage.

Although FIG. 7 illustrates the exemplary storage server 700, any of the management servers described herein (e.g., site management server) can include the components and functionality described with respect to the storage server 700.

Figure 8:
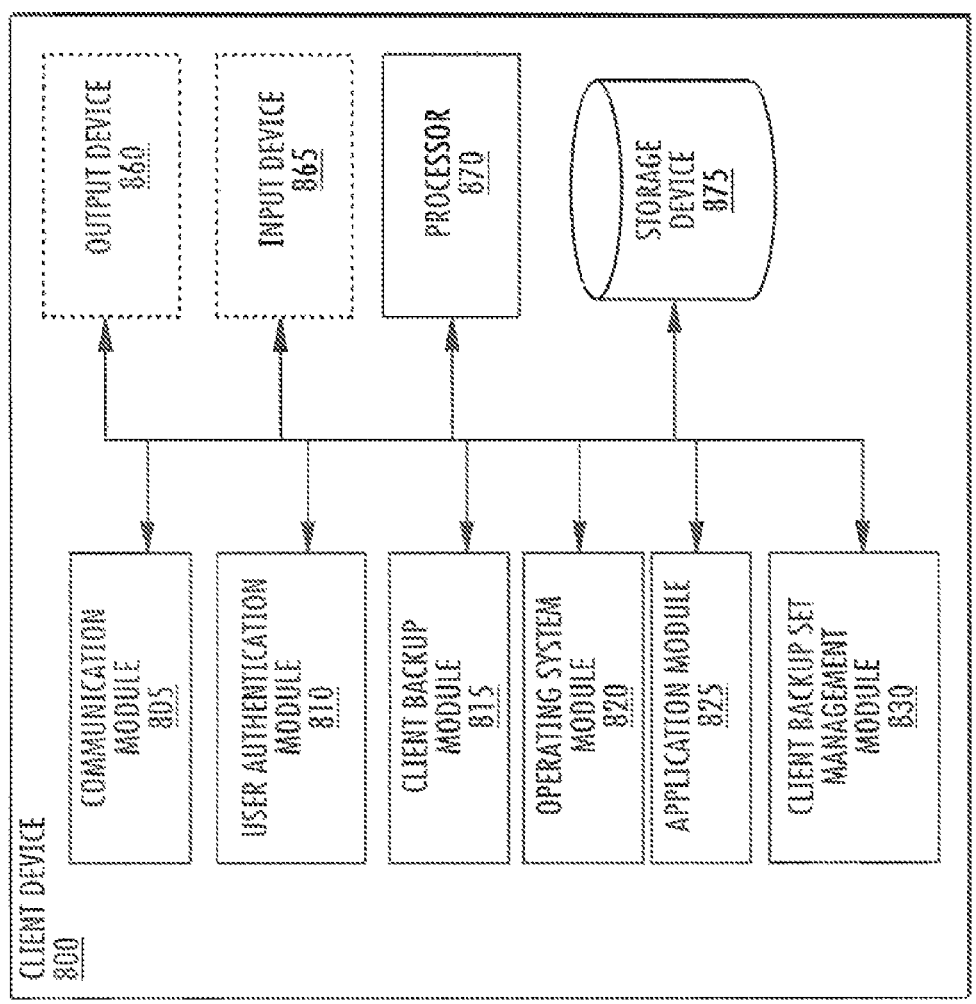
FIG. 8 is a block diagram illustrating an exemplary client device, according to one exemplary embodiment.

FIG. 8 illustrates an exemplary client device 800. The client device 800 includes a communication module 805, a user authentication module 810, a client backup module 815, an operating system module 820, an application module 825, a client backup set management module 830, an output device 860, an input device 865, a processor 870, and a storage device 875. The modules and/or devices can be hardware and/or software. The modules and/or devices illustrated in the client device can, for example, utilize the processor to execute computer executable instructions and/or include a processor to execute computer executable instructions (e.g., an encryption processing unit, afield programmable gate array processing unit, etc.). It should be understood that the client device 800 can include, for example, other modules, devices, and/or processors known in the art and/or varieties of the illustrated modules, devices, and/or processors. It should be understood that the modules and/or devices illustrated in the client device 800 can be located within the client device 800 and/or connected to the client device 800 (e.g., directly, indirectly, etc.), but outside of the physical components of the client device 800 (e.g., personal computer, mobile device, etc.).

The communication module 805 communicates data and/or information to/from the client device 800. The user authentication module 810 authenticates users for the client device 800 and/or the client backup module. The client backup module 815 backs-up, restores and/or identifies user data for backup and restoration. The operating system module 820 operates an operating system on the client device 800. The application module 825 operates one or more applications on the client device 800. The client backup set management module 830 manages backup sets stored on the client device.

The output device 860 outputs information and/or data associated with the client device 800 (e.g., information to a printer (not shown), information to a speaker, etc.). The input device 865 receives information associated with the client device (e.g., instructions from a user, instructions from a computing device, etc.) from a user (not shown) and/or a computing system (not shown). The input device 865 can include, for example, a keyboard, a scanner, an enrollment device, a scale, etc.

The processor 870 executes the operating system and/or any other computer executable instructions for the client device (e.g., executes applications, etc.). The client device 800 can include random access memory (not shown). The random access memory can temporarily store the operating system, the instructions, and/or any other data associated with the client device. The random access memory can include one or more levels of memory storage (e.g., processor register, storage disk cache, main memory, etc.).

The storage device 875 stores the files, user preferences, backup sets, access information, an operating system and/or any other data or program code associated with the management server (e.g., site management server, data center management server, etc.). The storage device 875 can include a plurality of storage devices. The storage device 875 can include, for example, long-term storage (e.g., a hard drive, a tape storage device, flash memory, etc.), short-term storage (e.g., a random access memory, a graphics memory, etc.), and/or any other type of computer readable storage.

Figure 9:
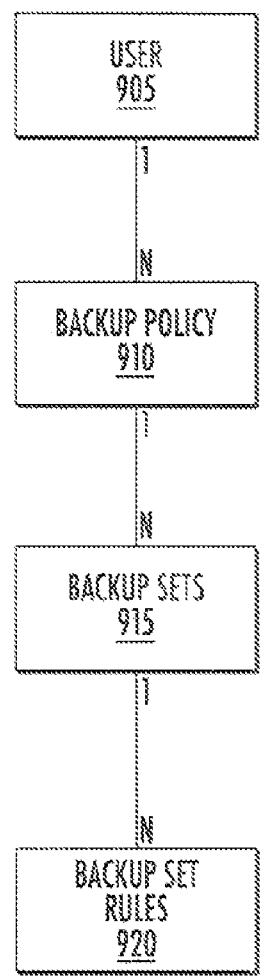
FIG. 9 is a relational diagram illustrating relationship between a user and backup sets.

As illustrated in FIG. 9, each user 905 can be associated with one or more backup policies 910. For example, a user 905 has multiple client devices and has a separate backup policy for each client device (e.g., home computer backup policy for the user's home computer, personal digital assistant (PDA) backup policy for the user's FDA, mobile device backup policy for the user's mobile device, etc). In other embodiments, users can have multiple backup policies for each client device (e.g., music backup policy and document backup policy for the user's computer, calendar backup policy, contact backup policy, and email backup policy for the user's mobile device, etc.).

In some embodiments, each backup policy 910 can include one or more backup sets 915. A backup set 915 can include a grouping of files according to backup set rules 920. The backup set rules 920 can include pre-defined criteria (e.g., above a set size, below a set size, etc.) and/or dynamically generated criteria. The pre-defined or dynamically generated criteria can include folder paths (e.g., "C:\users\jdoe\My Movies"), file extensions (e.g., ".mov"), file size specifications (e.g., file size less than 50 MB), file modification date specification (e.g., files modified after Jan. 1, 2009), and/or any other type of pre-defined or dynamically generated parameter. The backup set 915 can be, for example, defined with any combination of these criteria and/or any other information (e.g., other criteria, user inputs, etc.). In some embodiments, one or more folder paths are utilized to define a backup set. The backup policies 910 can be, for example, in binary format, American Standard Code for Information Interchange (ASCII) format, Extensible Markup Language (XML) format, and/or any other format.

Figure 10A:
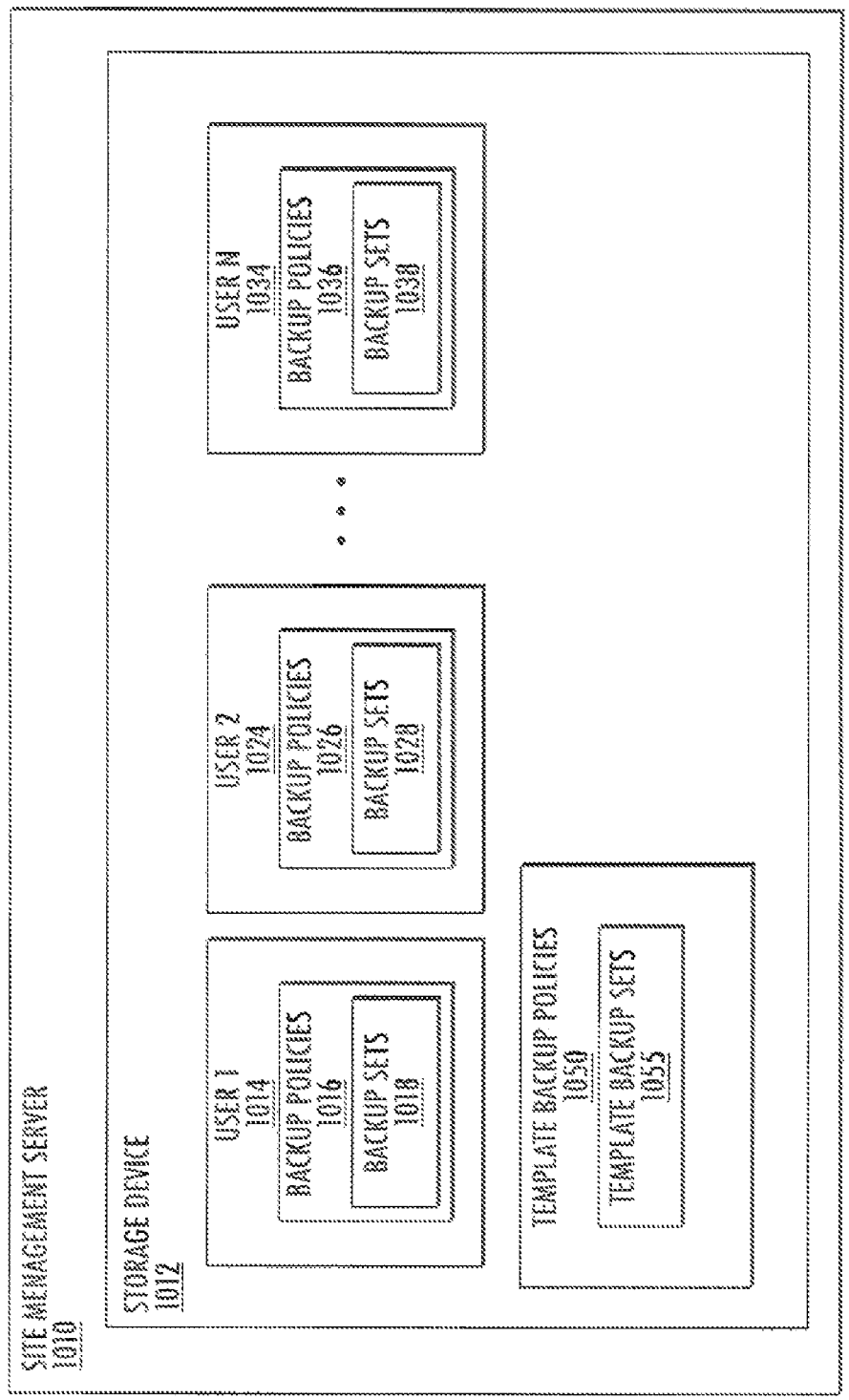
FIG. 10A is a block diagram illustrating an exemplary management server.

FIG. 10A illustrates the site management server 1010 storing each user's 1014, 1024 through 1034 backup policies 1016, 1026, through 1036 and backup sets 1018, 1028 through 1038. The site management server 1010 can periodically backup the user's backup policies 1016, 1026, through 1036 and/or backup sets 1018, 1028 through 1038. Each user's backup policies 1016, 1026, through 1036 and backup sets 1018, 1028 through 1038 may also be stored on the user's client devices as illustrated in FIG. 10B. FIG. 10B illustrates an exemplary client device 1070 storing on a storage device 1070 backup policy 1080 and backup sets 1085.

The site management server 1010 can store default or template backup policies 1050, and default or template backup sets 1055. In some embodiments, the template backup policies 1050 are managed (e.g., updated, added, deleted, etc.) by the site management server 1010. The template backup policies 1050 and template backup sets 1055 may be used, for example, for new users or for existing users registering new client devices. In this embodiment, if a new user registers with the backup management system, the new user can be set up to use the template backup policies 1050 and template backup sets 1055 maintained by the site management server 1010.

Figure 11:
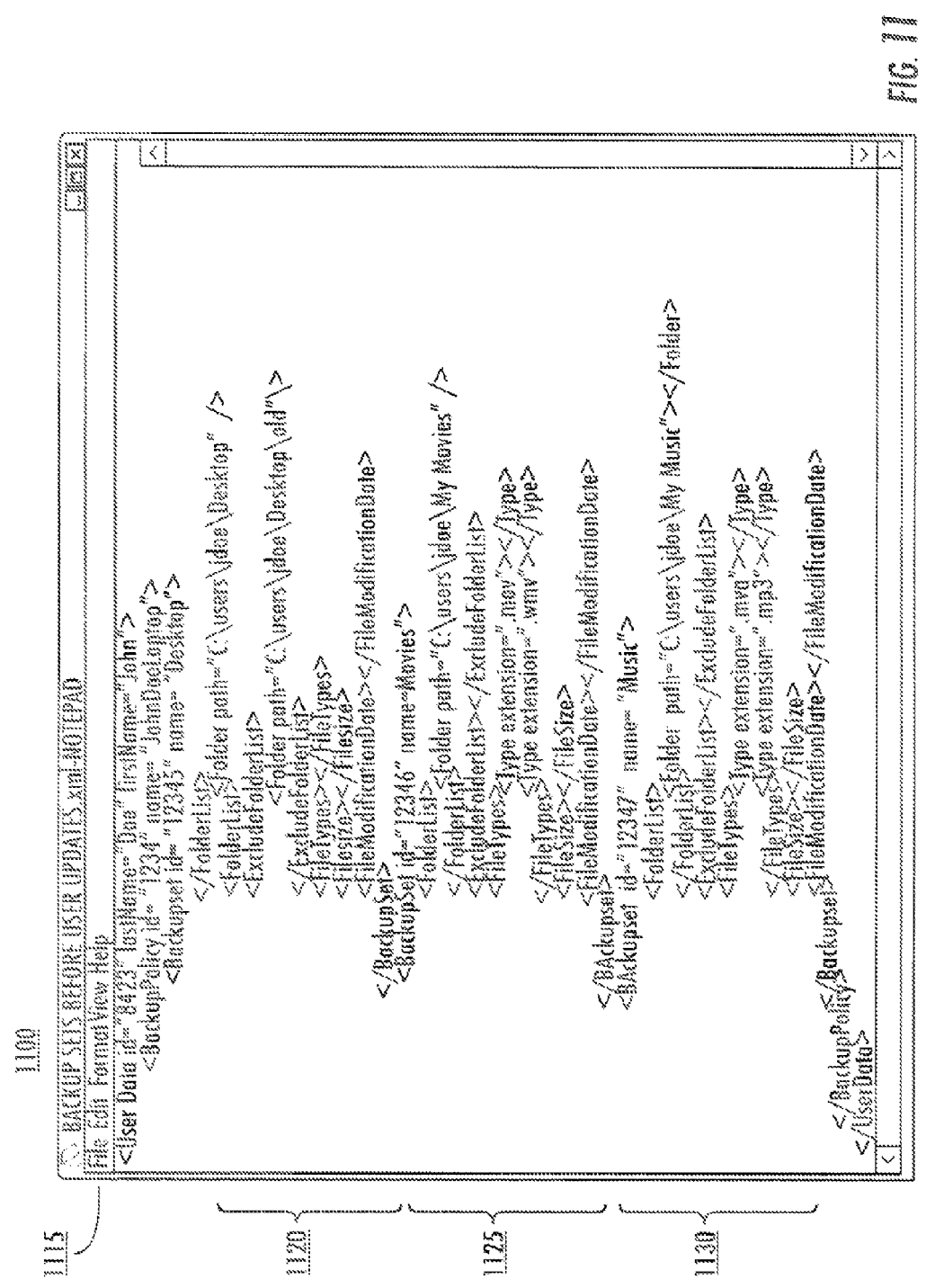

FIG. 11 illustrates an exemplary backup policy 1115 for user "John Doe". The backup set policy 1115 includes three exemplary backup sets "Desktop" 1120, "Movies" 1125, and "Music" 1130. These three backup sets may be template backup sets originally created by the site management server 600. In other embodiments, at least one of the backup sets may have been previously created or modified by the user.

The "Desktop" backup set 1120 is defined as including all files in the "C:\users\jdoe\Desktop" folder, except for files in the "old" subfolder. Accordingly, all files in the Desktop folder, except for the files in the "old" subfolder will be backed up by the client backup module. The "Movies" backup set 1125 is defined as including ".mov" and ".wmv" files in the "C:\users\jdoe\My Movies". Accordingly, for this backup set, all files in the "My Movies" folder with ".mov" and ".wmv" extensions will be backed up by the client backup module. Finally, the third backup set "Music" 1130 includes all ".mva" and ".mp3" files in the "C:\users\jdoe\My Music" folder. For the "Music" backup set 1130, all files in the "My Music" folder with ".mva" and ".mp3" extensions will be backed up by the client backup module.

FIG. 12 illustrates an exemplary backup policy after the user makes modifications to the "Movies" backup set 1125. In this example, the user adds ".m4v" file format to the "Movies" backup set 1125. As a result, the updated backup policy 1215 includes a "Movies" backup set 1225 with a ".m4v" file extension included in the list of file extensions. The user may further modify any of the three backup sets 1220, 1225, 1230 or create a new backup set.

The grouping of files into backup sets can advantageously help users to understand what is and what is not being backed up. Using interfaces as illustrated in the screenshots of FIGS. 12-17, users can easily tell what files and folders are being backed up. In some embodiments, a user may only realize that a file or folder of interest to the user was not backed up after their computer suffered a disk failure. Accordingly, the user interfaces as illustrated in the screenshots of FIGS. 12-17 advantageously enable the user to proactively correct this issue of files and/or folders not being backed up, thereby increasing the value of the backup system for the user and decreasing the inefficiencies associated with data loss for the user.

As discussed herein, the interfaces illustrated in FIGS. 13-18 allow users to view and manage what files and folders are scheduled for backup. FIG. 13 illustrates a screenshot of an interface that allows users to view their backup sets. The interface displays information about backup sets 1310, such as backup set name 1320, total number of files 1330 and total size of files 1340 in each backup set. This interface also illustrates which backup sets are selected for backup. The user may use this interface to select and un-select individual backup sets. Additional information about backup sets may be shown to the user including what time each backup set is scheduled for backup, definition criteria for each backup set, etc.

In some embodiments, the user can reset all backup set selections to the default backup sets created by the management server. In other embodiments, the default backup sets that do not match any files on the client device may be hidden from the user. In other embodiments, the user can disable any of the backup sets such that files in the disabled backup sets will no longer be backed up. The user's backup sets can consist entirely of default or template backup sets created by the management server. The user can create their own backup sets, modify default or template backup sets, and modify backup sets previously created by the user.

In some embodiments, a user clicking on one of the backup sets may show a list of files that are being backed up according to the rules associated with the selected backup set as illustrated in FIG. 14. For example, the right-side window 1420 in the interface 1400 displays all the files being backed up for the "Word Processing Documents" backup set 1410. The interface 1400 displays file name 1430, folder path 1440, file size 1450, and file type 1460 of each file included in the "Word Processing Documents" backup set 1410. Accordingly, users can tell what files are being backed up. If a user notices that certain files or folders are not being backed up, the user may modify an existing backup set to include the files of interest or alternatively create a new backup set and define it such that files or folders of interest will be backed up. Using the interface in FIG. 14, the user may be able to unselect individual files from being included in a backup set. Unselected individual files may then be viewed in the "Ignore Files/Folders" tab 1470 of the interface 1400. Users may be able to add the unselected individual files or folders back into the backup set.

Figure 15:
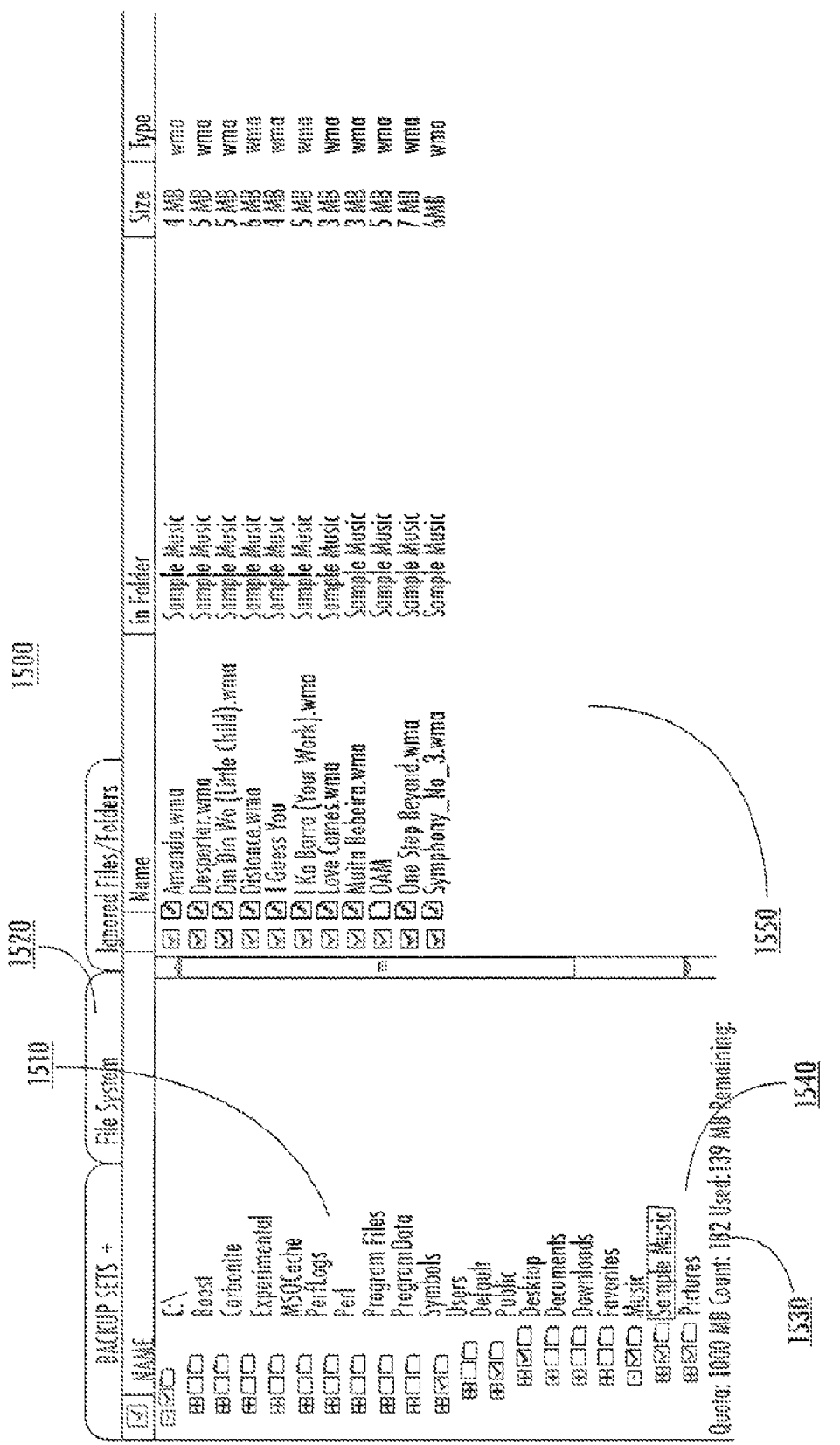

FIG. 15 illustrates a screenshot of an interface 1500 allowing the user to view a tree 1510 of all folders on a user's client device. To view the tree of all folders 1510 the user clicks on the "File System" tab in the interface 1500. The interface 1500 displays an indication whether each shown folder is being backed up. In addition, the interface 1500 displays a summary 1530 of quota, total number and total size of files selected for backup. When a user clicks on one of the folders, a list of files contained in the selected folder is shown along with an indication of whether each of those files is being backed up. For example, the user clicking on the "Sample Music" folder 1540 causes the interface to display a list of files 1550 contained in the "Sample Music" folder 1540. The user may be allowed to select and unselect individual files and folders in this interface such that corresponding backup sets are updated. In some embodiments, when a folder is selected for backup, all of its subfolders and files can be selected for backup. In some embodiments, when a user selects a folder or a file to be backed up that is not included in any of the backup sets of the user, then the selected folder or file may be added to an existing backup set that includes files and folders specifically selected by the user. In other embodiments, a new backup set may be automatically created to include a selected file or folder, and the user can later customize the new backup set.

Figure 16:
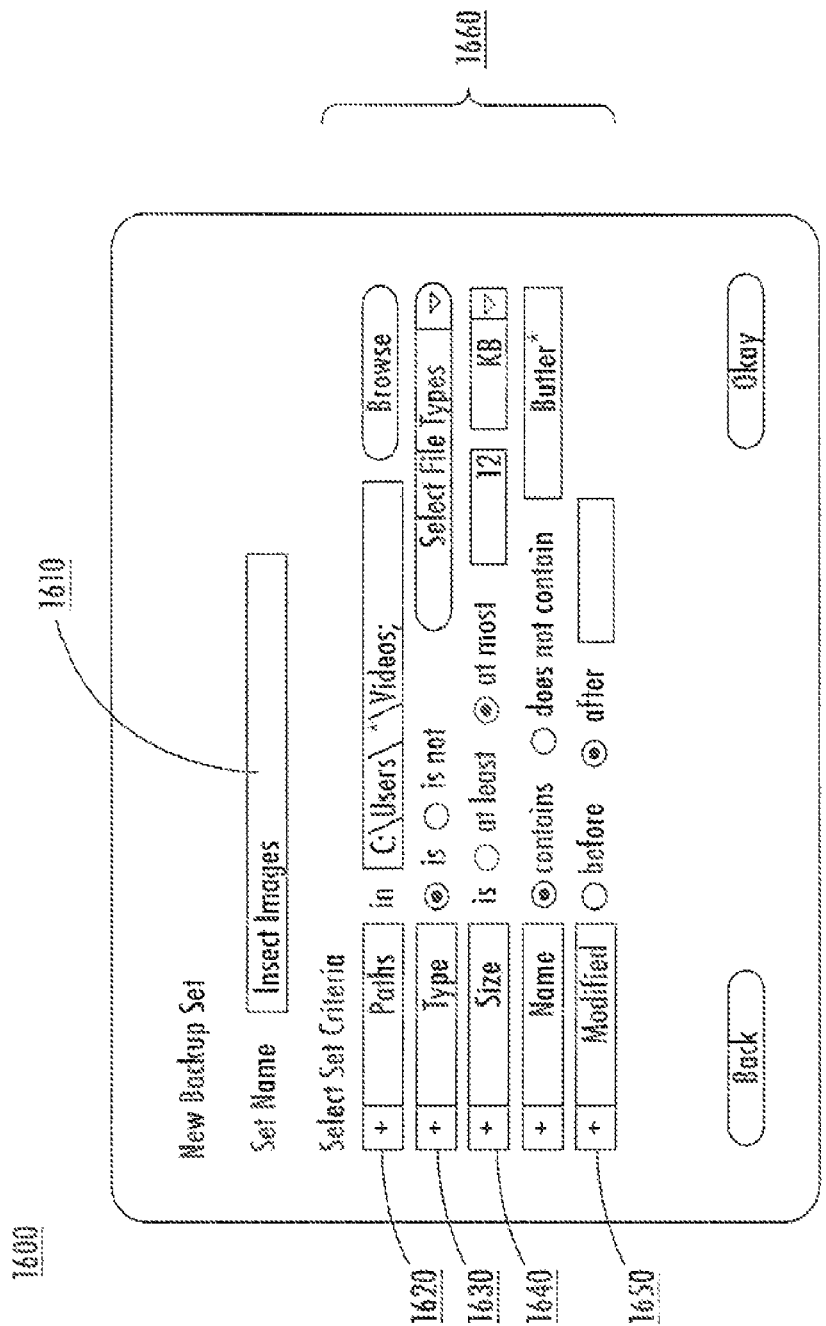
FIG. 16 illustrates an exemplary interface for creating a new backup set or for updating an existing backup set.

FIG. 16 illustrates a screenshot of an interface 1600 that provides the user with the ability to create new backup sets. The user can create a new backup set by entering a backup set name 1610, and defining backup set criteria 1660 such as list of folder paths 1620, list of files extension 1630, file size specification 1640, file modification date specification 1650, etc. The defining backup set criteria 1660 can include excluded folders, excluded files, excluded file types, etc. The defining backup set criteria 1660 can be any combination of the parameters listed above. For example, the user can create a new backup set called "Small Movie Clips" and define it as a set of files of various types, including ".mov" and ".wmv", where the size of each file must be less than 50 MB.

In some embodiments, the interface 1600 enables the user to enter the next backup time as well as how often the new backup set should be backed up. The user can create a new backup set without enabling it for any scheduled backups. In some embodiments, once the user enters the new backup set, the updated list of the user's backup sets is transmitted to the site management server 600 from the client device 800. In some embodiments, the updated backup sets, including the newly created backup set, is stored on the client device storage 875. A user can create backup sets that overlap in terms of what files are included in each backup set.

The interface 1600 can enable the user to modify an existing backup set. In some embodiments, the user can update any of the defining backup set criteria 1660. For example, the user can modify the list of file extensions 1630 by adding, removing or updating a file extension. For example, the user can modify the "Small Movie Clips" backup set by adding a new file extension ".m4v" to the list of file extensions 1630 defining this backup set. The user can modify the list of folder paths 1620 by adding, removing or updating one or more folder paths. In addition, the user can modify the size file restriction parameter 1640 and/or the file modification date parameter 1650. In other embodiments, the interface 1600 can include other criteria defining the backup set not shown in FIG. 16 which the user may be allowed to modify (e.g., backup set description). In other embodiments, the user interface 1600 can include an option to restore the backup sets to defaults.

Figure 17:
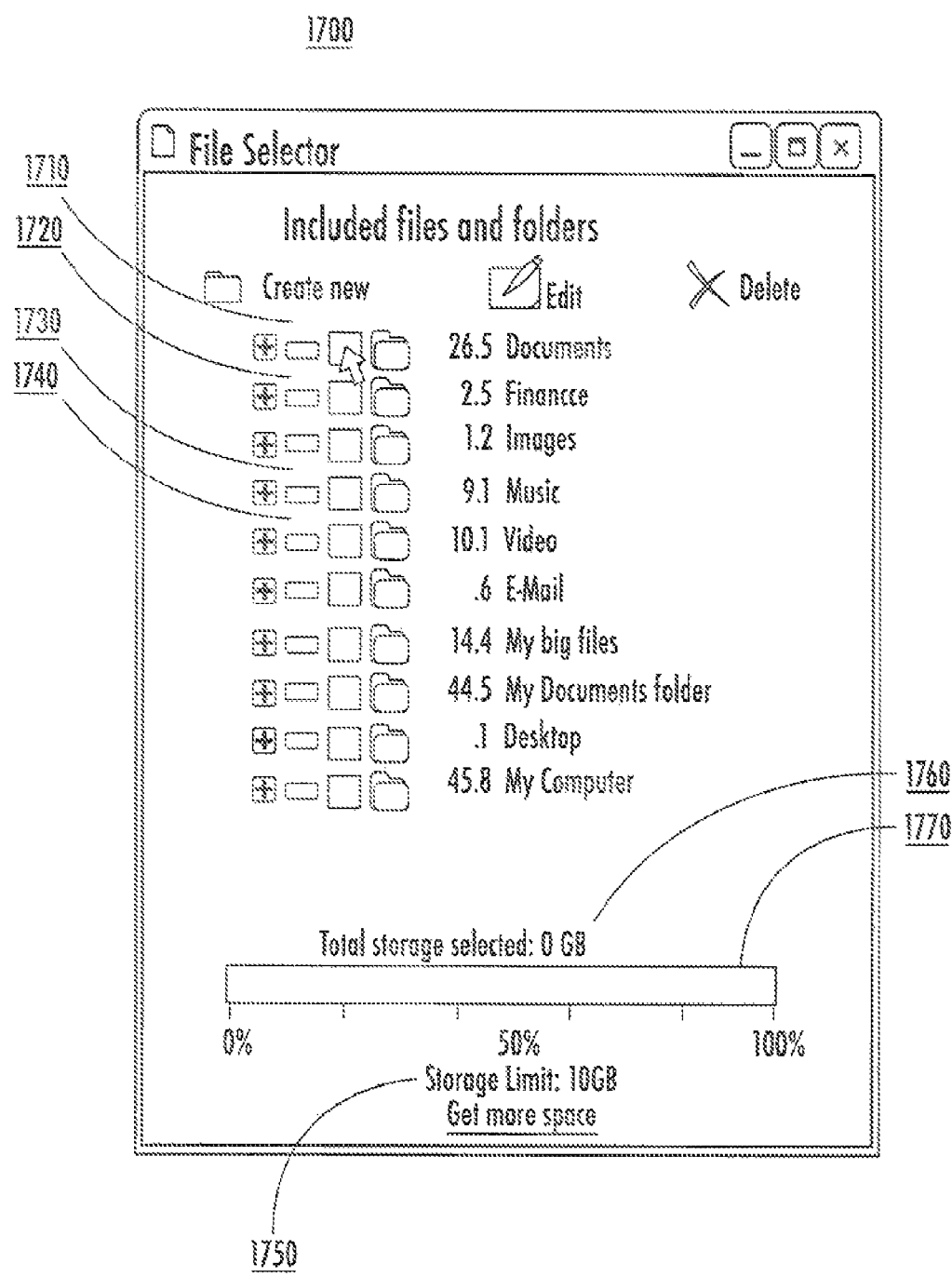
FIG. 17 illustrates an exemplary interface for displaying storage usage information.

FIG. 17 illustrates an interface 1700 displaying a list of backup sets with color coding blocks (e.g., 1710, 1720, 1730, 1740) next to each backup set to inform the user whether selecting a backup set will make the user go over a storage quota limit 1750. FIG. 17A displays total amount of selected storage 1760 and a percentage bar 1770 indicating percentage of selected storage. As shown, the storage quota 1740 is 10 GB and the total amount of selected storage 1760 is 0 GB. The color coding or other visual symbols may advantageously make it easier for the user to determine whether the quota limit 1750 is close to being reached.

As illustrated in FIG. 17, the color coding technique utilizes boxes next to each backup set, shown in different colors, depending on whether selecting the folder will make the files or folders being backed up as part of the backup set go over the storage quota. In some embodiments, a red box located next to a backup set indicates to the user that backup of this backup set will use up a lot more than 100% of allowed storage quota 1750. For example, the "Documents" backup set is shown to have a size of 26.5 GB. The "Documents" backup set is marked with a solid red box 1710 next to it, indicating that selecting the "Documents" backup set for backup will put the user well over the allowed storage quota 1750 of 10 GB.

In some embodiments, the red box can be partially filled, indicating to the user that the backup for the corresponding backup set would use slightly more than 100% of allowed storage quota 1750. For example, a "Video" backup set having a size of 10.1 GB has a partially filled red box 1740 next to it indicating that the backup set size is slightly larger than the total allowed storage quota 1750. In other embodiments, a percentage of a fill of a partially filled box can be proportional to the backup set size.

In some embodiments, a backup set that would use 80-100% of the allowed storage quota 1750 can have a yellow box next to it, signifying that the backup set will not put the user over the allowed quota 1750, but that the user is very close to reaching the quota 1750. A backup set of a smaller size can have a white or empty box next to it signaling to the user that selecting this folder will not put the user over the quota and there is still space left to further select additional folders or files for backup. For example, the "Finance" folder with a size of 2.5 GB has a box 1720 displayed next it. In some embodiments, the box 1720 can be of white color indicating that the "Finance" backup set uses less than 80% (or any other percentage) of the allowed storage quota 1750. In other embodiments, other visual indications (e.g., symbols, icon change, etc.) can be used to indicate storage quota usage.

The colors of the colored blocks and/or the visual indications may change depending on how much space is left after backup sets are selected, unselected, created, and/or modified. For example, with a 1000 MB quota, a backup set that is 400 MB large would have a white block next to it. However, once the user selects a backup set for backup that is larger than 600 MB, then the white block next to the 400 MB folder can change color (e.g. to red) to signal that the 400 MB backup set can no longer be selected to fit within the allowed storage quota.

As illustrated in FIG. 14, when the user clicks on the backup set "Word Processing Documents", a list of corresponding files and/or folders is displayed. In some embodiments, the visual indicators such as colored boxed (not shown) can be located next to each file in the right window panel 1420 indicating to the user whether selecting a file will make the user go over a storage quota limit.

Figure 18:
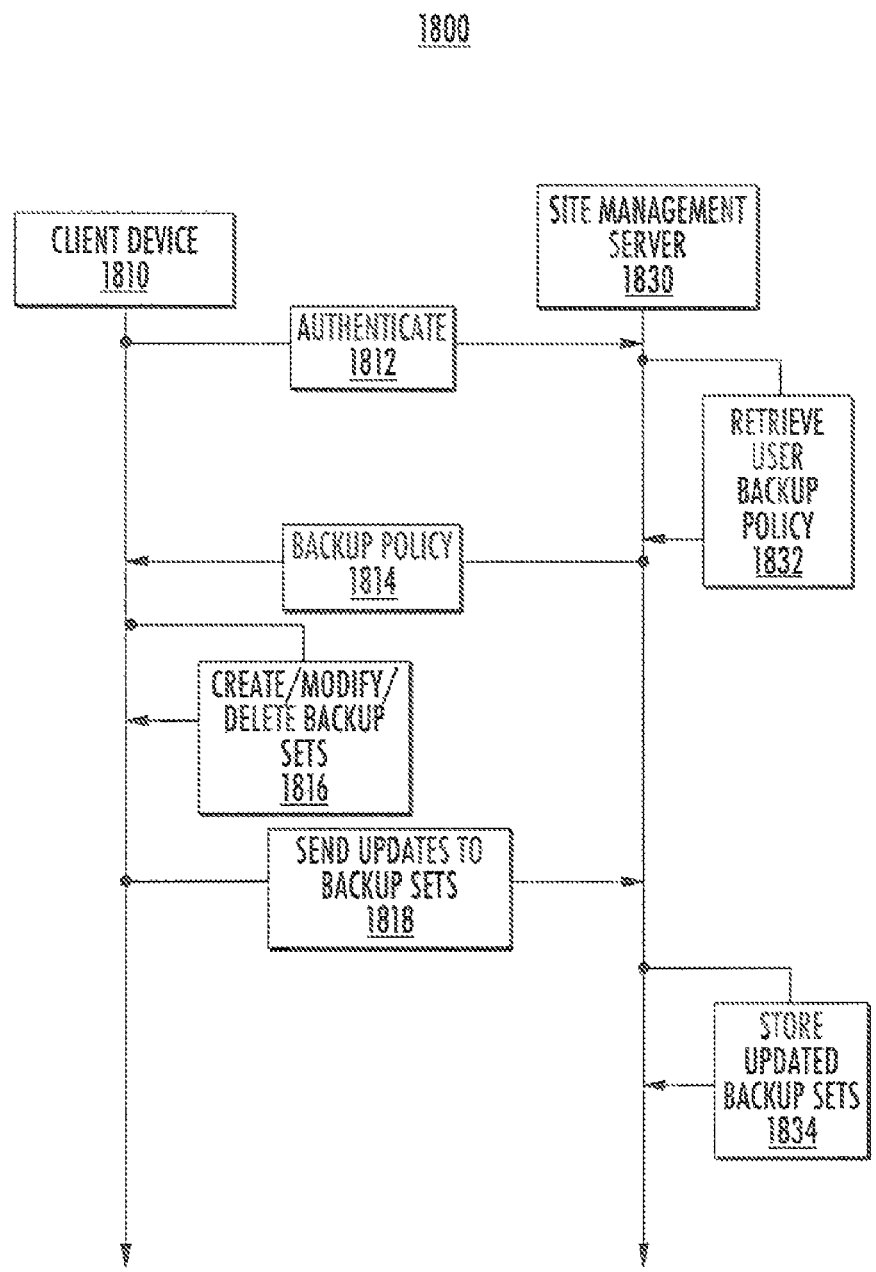
FIG. 18 illustrates a flow chart of the exemplary flow of data between a client device and a management server.

In FIG. 18, a flow chart 1800 relating to transfer of data between a client device 1810 and a site management server 1830 is shown, according to an exemplary embodiment. The user authentication module 610 authenticates (1812) the client device 1810 to the site management server 1830. In some embodiments, the user's backup policy may be stored on the client device 1810, in which case the client device 1910 will retrieve the backup policy from its own storage device. In other embodiments, the user's backup policies are stored on the site management server 1830. In this embodiment, the backup set management module 625 retrieves (1832) the backup policy for the client device 1810 and sends (1914) the retrieved backup policy back to the client device 1810. The user can update their backup sets by creating new backup sets, modifying or deleting (1816) existing backup sets. In some embodiments, the client backup set management module 830 stores the updated backup sets in the storage device 875. The client backup set management module 830 transmits (1917) updated backup sets back to the backup set management module 625 for storage and processing. The backup set management module 625 stores (1834) the received backup sets in the storage device 675.

Figure 19:
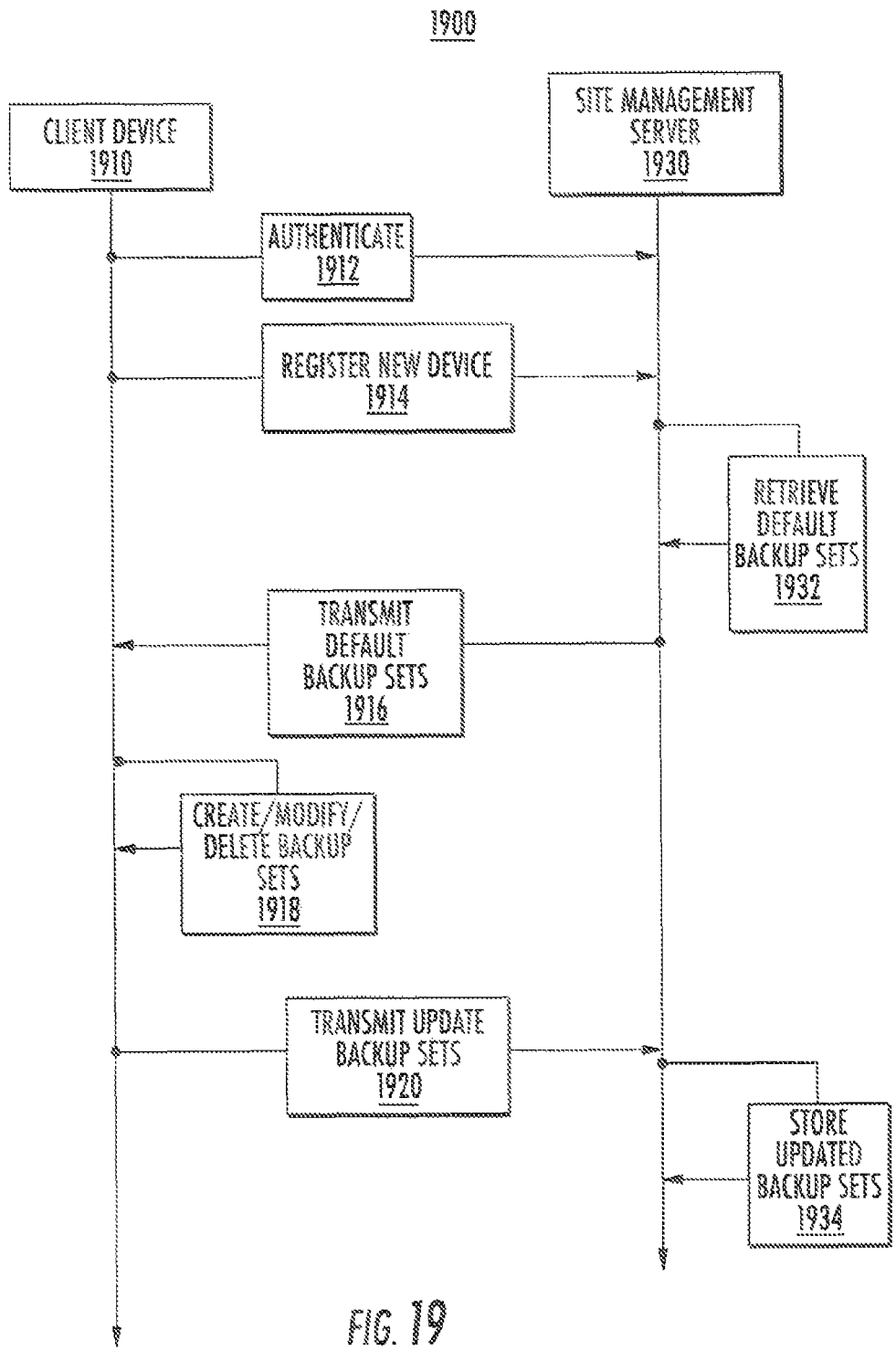
FIG. 19 illustrates a flow chart of the exemplary flow of data between a new client device and a management server.

FIG. 19 depicts a flow chart 1900 relating to registering a new client device 1910. When an existing or new user registers the new client device 1910, the user authentication module 610 authenticates (1912) and registers (1914) the new user or new client device 1910. The backup set management module 625 retrieves (1932) a set of default backup sets from storage. The set of default backup sets is managed by the backup set management module 625. As discussed herein, the default backup sets may incorporate aggregated changes made to the backup sets by other users. The backup set management module 625 transmits (1916) the default backup sets back to the client device 1910. In some embodiments, the backup set management module 625 transmits a default backup policy to the client device 1910. The user can modify (1918) the default backup sets in order to ensure backup of all the files and folders of interest to the user. The client backup set management module 830 manages and stores the updated backup sets on the client device 1910. The client backup set management module 830 transmits (1920) the updated backup sets back to the backup set management module 625 and stores the received updated backup sets in the storage device 675. Based on the changes to the backup sets made by the registered users, the backup set management module 625 can modify the default backup sets and backups sets of other users.

Figure 20:
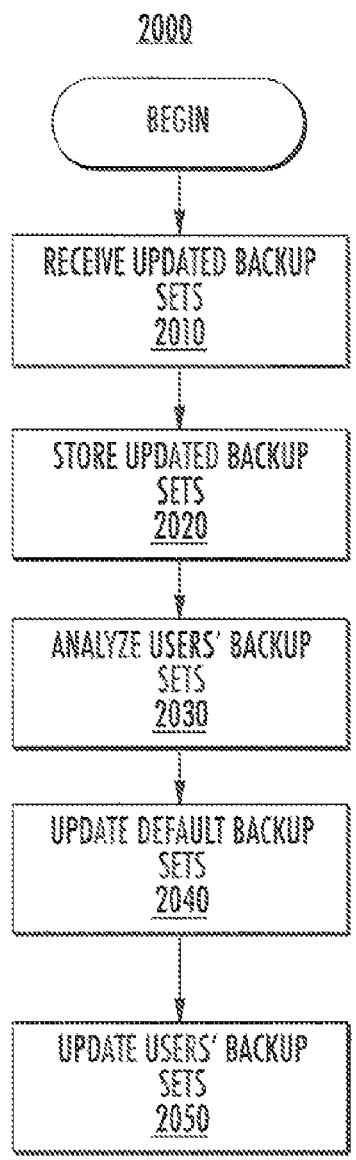
FIG. 20 illustrates a flow chart showing processing of backup sets, according to an exemplary embodiment.

FIG. 20 further illustrates a flow chart 2000 relating the site management server 600 analyzing backup sets received from client devices. The backup set management module 625 receives (2010) updated backup sets from one or more client devices. The backup set management module 625 stores (2020) received updated backup sets in the storage device 675 or other storage. The backup set management module 625 analyzes (2030) backup sets associated with one or more client devices. In some embodiments, the backup set management module 625 performs statistical analysis of modifications made by users to their backup sets, and determines whether to modify default or template backup sets based on the results of the analysis. The backup set management module 625 can aggregate modifications that users have made to their backup sets. For example, if a significant number of users (e.g., above a predefined number, above a predefined percentage of users, above a dynamically determined number of users associated with a user type, etc.) add a specific file type to their backup sets, the backup set management module 625 can determine to add this file type to one or more of the default backup sets. This feedback mechanism advantageously enables the backup and restoration process as described herein to learn from the users and distribute the learning to other users for the benefit of all of the users, thereby increasing the efficiency of the backup and restoration process by backing up more files that are important for the users. Based on the analysis performed in step 2030, the backup set management module 625 updates (2040) the default backup sets stored on the site management server 600.

In some embodiments, the backup set management module 625 automatically updates (2050) effected users' backup sets definitions based on other users' backup sets modifications without prompting the effected users. In these embodiments, the backup set management module 625 updates the effected users' backup sets definitions stored on the site management server 600 and transmits modified backup sets to the effected users client devices. For example, the backup set management module 625 determines that the backup sets of the effected users need to be updated with a new file type. The user preference module 620 can modify the users' backup sets based on this determination. In this embodiment, the users may have elected to have automatic updates performed on their backup sets. In some embodiments, if a user has previously made modifications to a backup set which contradict modifications that the management server determined to automatically apply to the user's backup set, then the user may be manually prompted with a dialog indicating that recommended modifications to the user's backup set may be applied by overwriting the user's backup set's definition. In other embodiments, the user's backup set definition may be overwritten without prompting the user.

In another embodiment, the backup set management module 625 determines that some critical backup set modifications need to be automatically applied to backup sets of some or all of the users, while for less critical backup sets modifications, the users may be manually prompted. In these embodiments, the users who accept recommended modifications or elect to have their backup sets automatically updated may advantageously benefit from other users' backup set modifications. For instance, some users may be using a new video file format (e.g., ".m4v") without having their backup sets updated with the new video file format. A large number of other users adding the new video file format to their backup sets may trigger the backup set management module 625 to update default backups sets as well as effected users' backup sets with this new video file format.

In some embodiments, the effected users are prompted whether they would like to update their backup sets with the backup sets changes recommended by the management server. Accordingly, each effected user may advantageously benefit from the feedback that the site management server 600 has received from other users about their backup sets. For example, one of the recommended changes may be to add the ".m4v" file format to one or more backup sets. The user may decide to ignore the recommended modifications to the user's backup sets. The user may also elect not to receive any future recommendations to update backup sets based on backup set changes implemented by other users.

In other embodiments, the users are only prompted when updates recommended by the backup set management module 625 conflict with users' previous updates to their backup sets. In these embodiments, the users may receive an indication that recommended backup sets updates can only be applied by overwriting their backup sets' definitions.

In other embodiments, a user may elect not to allow the site management server 600 analyze changes made by the user to the user's backup sets. In this embodiment, the client device 800 may still transmit to the site management server 600 the modified backup sets for storage and backup, but the site management server 800 will not analyze the changes made by the user. In another embodiment, a user may elect not to receive any recommendations or automatic updates to their backup sets based on changes made by the other users to their backup sets.

In other embodiments, the backup set management module 625 analyzes whether users are accepting recommended changes to their backup sets. Based on this analysis, the backup set management module 625 can determine whether to further modify template or default backup sets maintained by the backup set management module 625. The default backup sets may be used for new users or for existing users registering new client devices. The backup set management module 625 may also revert changes previously made to users' backup sets.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The client device can include, for example, a computer, a computer with a browser device, a telephone, an IP phone, a mobile device (e.g., cellular phone, personal digital assistant (FDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a computer-readable medium. Computer-readable media can be non-transitory in nature and can include both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for managing default backup sets based on user feedback, the method comprising:
    receiving an update to a backup set from a first client device;
    analyzing the update made to the backup set;
    updating a default backup set stored in a storage device based on the update to the backup set; and
    providing the default backup set, updated based on the update to the backup set of the first client device, to a second client device, receipt of the updated default backup set causing the second client device to back up one or more files according to the updated default backup set, the one or more files selected based on the update to the backup set of the first client device.

2. The method of claim 1, wherein the analyzing step further comprises determining that a number of client devices exceeding a predetermined threshold each made updates to a backup set of said client device identical to the update to the backup set made by the first client device; and wherein updating the default backup set is performed responsive to the determination.

3. The method of claim 1, further comprising:
    transmitting a notification request to a third client device, the notification request including a recommended update to a backup set associated with the third client device based on the update to the backup set of the first client device.

4. The method of claim 1, further comprising updating a backup set associated with the second client device based on the update to the backup set.

5. The method of claim 1, wherein the backup set comprising a grouping of files aggregated together according to a pre-defined criteria.

6. The method of claim 5, wherein the pre-defined criteria includes a folder path.

7. The method of claim 5, wherein the pre-defined criteria includes a file type.

8. The method of claim 5, wherein the pre-defined criteria includes a file size limit.

9. The method of claim 5, wherein the pre-defined criteria includes a file modification date.

10. A method for managing backup sets based on user feedback, comprising:
    receiving, by a first client device, from a backup set management server, a default backup set;
    transmitting at least one file to a backup server, by the first client device, according to the default backup set;
    receiving, by the first client device from the backup set management server, a recommended modification to the default backup set, the modification to the default backup set based on modifications made by one or more users to default backup sets provided to client devices associated with the one or more users, the recommended modification transmitted responsive to a number of the one or more users exceeding a predetermined threshold; and
    modifying the default backup set based on the recommended modification received from the server.

11. The method of claim 10, further comprising transmitting at least one additional file for backup to the backup server, the at least one additional file selected based on the modification to the default backup set.

12. The method of claim 10, wherein the backup set is a grouping of files aggregated together according to a pre-defined criteria.

13. The method of claim 10, wherein the pre-defined criteria includes a folder path.

14. The method of claim 10, wherein the pre-defined criteria include a file type.

15. The method of claim 10, further comprising displaying a plurality of backup sets associated with a client device in a user interface, and for each backup set, displaying an indicator indicating a backup set size relative to a total storage limit.

16. A system for managing backup sets based on user feedback, the system comprising:
    a processor coupled to a memory device storing a client backup set management module and a communication module, and a network interface in communication with a server;
    wherein the client backup set management module, when executed by the processor, is configured to modify a default backup set with a first modification; and
    wherein the communication module, when executed by the processor, is configured to:

send the first modification to the default backup to the server, and receive, from the server, one or more additional modifications to the default backup set made by one or more users of a corresponding one or more other client devices, the one or more additional modifications transmitted responsive to a number of the one or more users exceeding a predetermined threshold; and wherein the client backup set management module, when executed by the processor, is configured to further modify the default backup set based on the one or more additional modifications received from the server.

17. The system of claim 16, wherein the communication module is further configured to transmit a file for backup to the server, the file selected based on the further modification to the default backup set.

18. The system of claim 16, wherein the default backup set is a grouping of files aggregated together according to a pre-defined criteria.

19. The system of claim 16, further comprising a display module configured for displaying a plurality of backup sets associated with a client device in a user interface, and, for each backup set displaying an indicator indicating a backup set size relative to a total storage limit.

* * * * *